(12) United States Patent
Gibelin et al.

(10) Patent No.: US 12,497,584 B2
(45) Date of Patent: Dec. 16, 2025

(54) STIRRING DEVICE WITH A SHAFT, ADAPTED TO BE MOUNTED IN A FLUID-MIXING BIOREACTOR, AND METHOD FOR ASSEMBLING A STIRRING DEVICE

(71) Applicant: SARTORIUS STEDIM FMT SAS, Aubagne (FR)

(72) Inventors: Jérémy Gibelin, Signes (FR); Daniel Pessey, Aix en Provence (FR); Sebastian Purmann, Göttingen (DE)

(73) Assignee: Sartorius Stedim FMT SAS, Aubagne (FR)

( * ) Notice: Subject to any disclaimer, the term of this patent is extended or adjusted under 35 U.S.C. 154(b) by 1013 days.

(21) Appl. No.: 17/625,913

(22) PCT Filed: Jul. 3, 2020

(86) PCT No.: PCT/EP2020/068871
§ 371 (c)(1),
(2) Date: Jan. 10, 2022

(87) PCT Pub. No.: WO2021/004960
PCT Pub. Date: Jan. 14, 2021

(65) Prior Publication Data
US 2022/0267708 A1    Aug. 25, 2022

(30) Foreign Application Priority Data
Jul. 10, 2019   (EP) ..................................... 19185585

(51) Int. Cl.
*C12M 1/06*    (2006.01)
*B01F 27/07*   (2022.01)
(Continued)

(52) U.S. Cl.
CPC ........... *C12M 27/02* (2013.01); *B01F 27/071* (2022.01); *B01F 27/1111* (2022.01);
(Continued)

(58) Field of Classification Search
CPC ...... C12M 23/14; C12M 27/02; B01F 27/113; B01F 27/071; B01F 23/231266;
(Continued)

(56) References Cited

U.S. PATENT DOCUMENTS 3,243,165 A    3/1966  Woody et al.
4,456,382 A    6/1984  Mahler, II
(Continued)

FOREIGN PATENT DOCUMENTS

CH    363541 A     7/1962
DE    3110294 A1   1/1982

OTHER PUBLICATIONS

Search Report for European Patent Application No. 19185585.7 mailed on Jan. 23, 2020.
(Continued)

*Primary Examiner* — Lydia Edwards
(74) *Attorney, Agent, or Firm* — Heslin Rothenberg Farley and Mesiti P.C.; Victor A. Cardona, Esq.

(57) ABSTRACT

The stirring device, in particular for a fluid-mixing bioreactor, comprises a drive shaft including a rod, an agitating element and a sleeve of tubular shape. The sleeve forms a coupling sleeve receiving the shaft therethrough and is directly rotationally coupled to the rod. The agitating element, which has a hub with an annular side wall delimiting an inner space and an impeller assembly comprising blades, is indirectly rotationally coupled to the rod via the sleeve that is engaged in the inner space. One of an inner surface of the wall and an outer surface of the sleeve is a guiding surface with progressively reduced cross section. Axial
(Continued)

movement between the hub and the sleeve is prevented in a locked configuration of a sleeve fastening arrangement. Hub-sleeve contact areas can be axially distributed.

14 Claims, 9 Drawing Sheets

(51) Int. Cl.
| | |
|---|---|
| *B01F 27/1111* | (2022.01) |
| *B01F 27/113* | (2022.01) |
| *B01F 27/191* | (2022.01) |
| *B01F 27/192* | (2022.01) |
| *B01F 35/41* | (2022.01) |
| *B01F 35/513* | (2022.01) |
| *C12M 1/00* | (2006.01) |
| *B01F 101/22* | (2022.01) |

(52) U.S. Cl.
CPC .......... *B01F 27/113* (2022.01); *B01F 27/191* (2022.01); *B01F 27/192* (2022.01); *B01F 35/4121* (2022.01); *B01F 35/513* (2022.01); *C12M 23/14* (2013.01); *B01F 2101/22* (2022.01)

(58) Field of Classification Search
CPC ................ B01F 2101/22; B01F 35/513; B01F 35/4121; B01F 27/1111
See application file for complete search history.

(56) References Cited

U.S. PATENT DOCUMENTS

| | | | |
|---|---|---|---|
| 2015/0265988 | A1 | 9/2015 | Williams |
| 2017/0252709 | A1* | 9/2017 | Andersson .............. B01F 27/71 |

OTHER PUBLICATIONS

International Search Report and Written Opinion of the International Searching Authority for International Application No. PCT/EP2020/068871 mailed on Sep. 28, 2020.
International Search Report and Written Opinion dated Jan. 11, 2022, 7 pp.

* cited by examiner

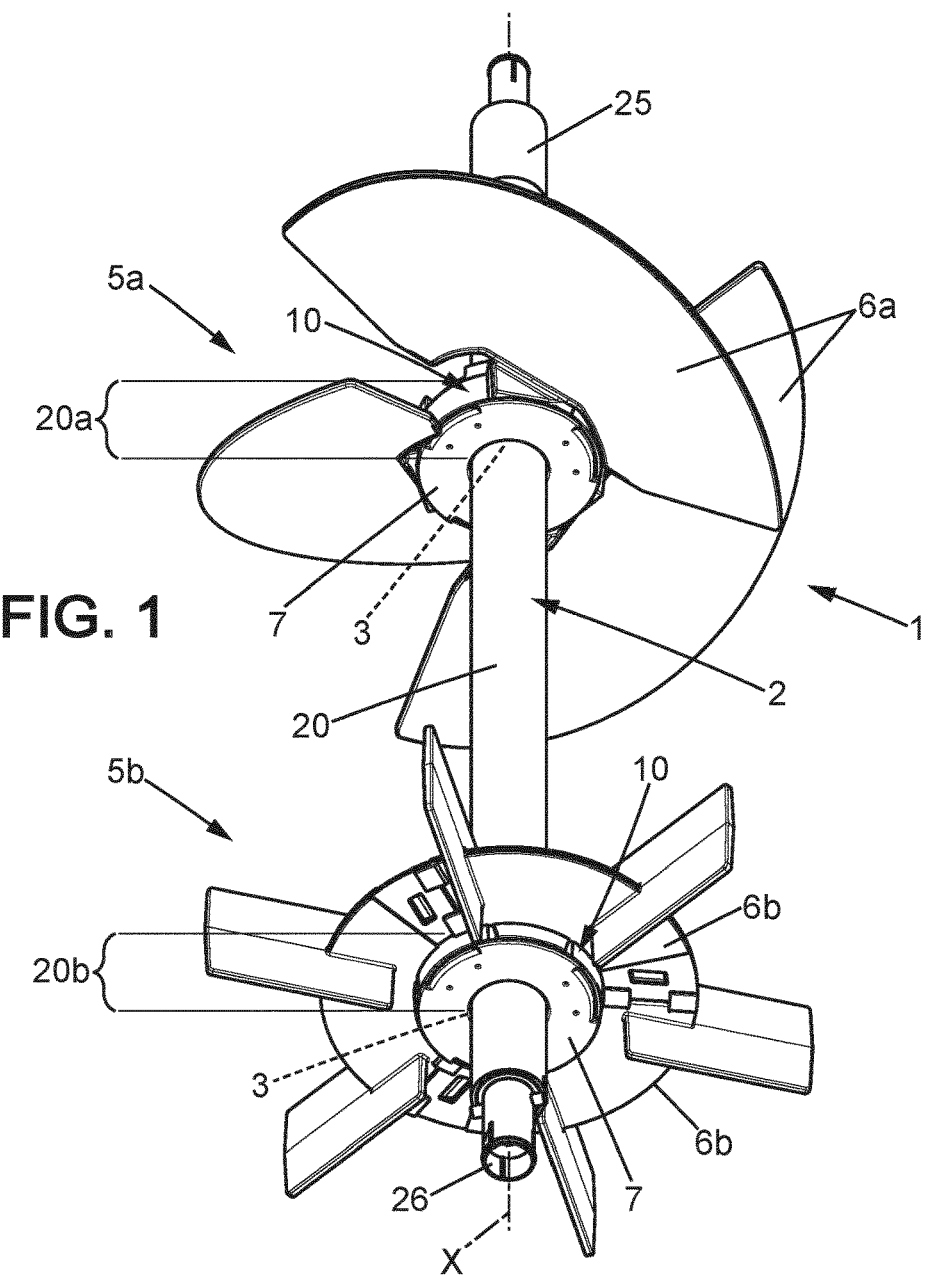
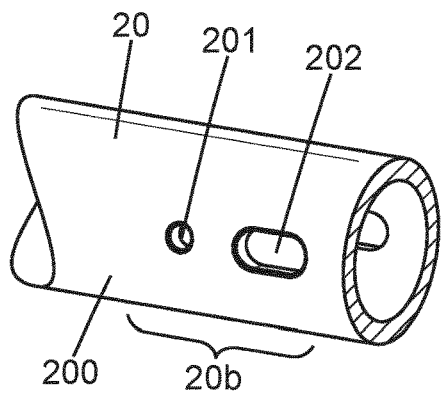

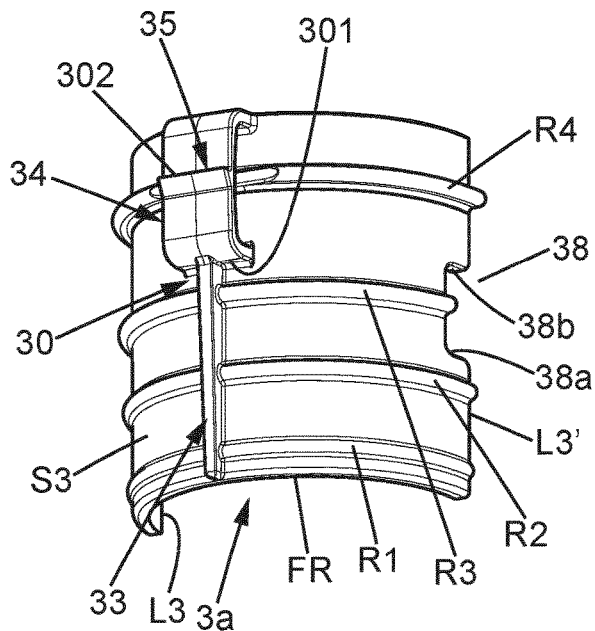
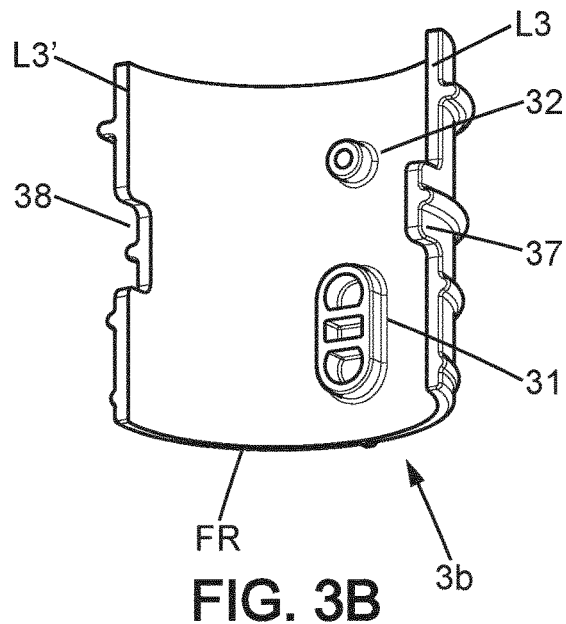
FIG. 3A
FIG. 3B
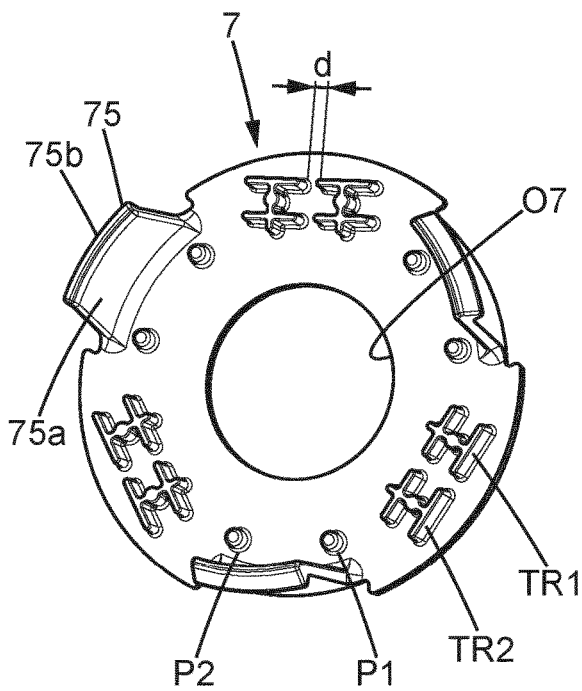
FIG. 4

STIRRING DEVICE WITH A SHAFT, ADAPTED TO BE MOUNTED IN A FLUID-MIXING BIOREACTOR, AND METHOD FOR ASSEMBLING A STIRRING DEVICE

CROSS REFERENCE TO RELATED APPLICATIONS

This application is a national stage filing under section 371 of International Application No. PCT/EP2020/068871, filed on Jul. 3, 2020, and published on Jan. 14, 2021 as WO 2021/004960 A1 which claims priority to European Patent Application No. 19185585.7, filed on Jul. 10, 2019. The entire disclosure of each application is hereby incorporated herein by reference.

FIELD OF THE INVENTION

The invention relates to the field of mixer-containers, and more particularly relates to a stirring device for a mixer-container, especially a stirring device appropriate for single-use applications.

It also relates to a method of assembling a stirring device, in particular for use in a bioreactor intended for receiving a biopharmaceutical fluid for mixing, as well as a fluid-mixing system that is typically provided with a disposable container and the stirring device.

The term "biopharmaceutical fluid" is understood to mean a product of biotechnology (culture media, cell cultures, buffer solutions, artificial nutrition liquids, blood products and blood product derivatives) or a pharmaceutical product or more generally a product intended for use in the medical field. The invention also applies to other products subject to similar requirements regarding packaging.

BACKGROUND OF THE INVENTION

Mixer-container systems are known which enable mixing biopharmaceutical fluid. Such systems comprise a rigid outer containment device receiving a sterile disposable container. The container comprises a flexible wall defining an inner space to be filled with the biopharmaceutical fluid. The container also comprises a stirring device, which includes one or more mixing members (typically impellers) attached to a descending shaft. The shaft is attached to the container at a first bearing and a second bearing. The shaft of the container may comprise, at the first bearing, a disc having magnets that can be placed facing a similar disc connected to a motor, the effect of the motor thus magnetically driving the shaft to rotate. The shaft thus forms a drive shaft that turns in order to mix the biopharmaceutical fluid.

A stirring device typically includes a drive shaft with one or more impellers mounted to the drive shaft. Each impeller includes a plurality of blades of that are attached to one or more hubs, which are in turn coupled to the drive shaft. The blades of each impeller extend radially outwardly from the hub. Each hub and blade combination is located inside a vessel or pouch-like container that is filled with a fluid to be mixed. Rotation speed required for mixing operations can be higher than 60 rpm for inner volumes greater than 500 or 1000 L. Rotation speed of the drive shaft is for instance typically higher than 120 rpm for lower volumes. At the radial free ends of the blades, speed is thus especially high and it may create significant stress and vibration. Blades may have a radial extension higher than 25 cm or 30 cm as measured between a hub connection end and the free end, especially when the inner volume of the pouch-like container is higher than 500 or 1000 L.

For mixing biopharmaceutical fluid in large containers, it is desired to have a stirring device that can be easily assembled and attached to a drive shaft, while preventing risk of accidentally disassembling the hub. Besides, for use in a bioreactor, the stirring device is generally made only of plastic material, so that stress during stirring operations causes fatigue and breakage. Such risk should be prevented.

For assembling the blades around the shaft, human operations may be still required, in particular final screwing for having the agitating element positioned around the shaft. Some solutions involve use of a screwing without machine intervention as it could alter the plastic surfaces of the components when handling and maintaining positions for assembling. In any case, screwing a hub of an agitating element is often not satisfactory as particles are generated, especially when the components forming the stirring device are all made of plastic material. Document U.S. Pat. No. 4,456,382 describes an agitator device for use in a reactor tank having a longitudinal shaft coupled to a hub assembly. Several screwing operations are required to obtain the hub assembly.

Besides, screwing may be performed differently (no strict repeatability) when performed by human operators and it would be preferable if torque repeatability can be not dependent from user operations. In system using screwed agitation element, vibration generation may also be an issue.

Connection by clips and gluing connection are also options for having a hub coupled to the drive shaft. However, clips or glue are not recommended for torque transmission. Gluing fails to correspond to a repeatable assembling process (moreover, several problems about material compatibility exist). Toxicity issues also arise due to glue and this can lead to contamination of the assembly if the adhesion process is not carried out correctly, which is particularly troublesome because any chemical and/or particulate contamination of the contents of the bioreactor must absolutely be avoided.

In some solutions, the drive shaft is provided with an outer rod having a non-circular cross section. Document US 2015/0265988 A1 shows use of a polygonal section of a rod to accommodate an impeller assembly. Such solution makes the rod more difficult to be produced, which is not appropriate for single-use applications. Additionally, such arrangement is not simple to obtain due to inherent geometric tolerances and possible variations of temperature (dilation of the plastic parts forming the rod with the non-circular section may occur, thus causing problems for assembling operations).

More generally, problems with geometric tolerances and problems with risks of fatigue and breakage still exist so that there is a need for a better compromise between ease at assembling a stirring device for single-use applications and robustness for efficient torque transmission, even for high speed rotations.

OBJECTS AND SUMMARY OF THE INVENTION

The invention aims to solve at least one or some of the disadvantages described above, and in particular aims to optimize the way the agitation element is mounted onto an outer tubular surface, typically a cylindrical surface, of a shaft.

For this purpose, in a first aspect, the invention relates to a stirring device, in particular for a mixer-container, the device comprising:
- a rotatable drive shaft extending along a longitudinal axis;
- an agitating element; and
- a sleeve of tubular shape;

wherein the drive shaft comprises a rod, the sleeve forming a coupling sleeve receiving the drive shaft therethrough and being directly rotationally coupled to the rod of the drive shaft, the sleeve being sandwiched in an assembled state between a mounting area of the rod and the agitating element, wherein the agitating element comprises:
- a hub which has an annular side wall that extends longitudinally around a central axis, preferably between a first axial open face and a second axial open face, the annular side wall delimiting an inner space; and
- an impeller assembly comprising a set of blades, which are preferably blades with generally radial extension, the blades and the hub being adapted to be rotationally coupled to the rod; wherein the hub is directly rotationally coupled to the sleeve, one of an inner surface of the annular side wall and an outer surface of the sleeve being a guiding surface provided with a progressive reduction of cross section with increased distance from the axial insertion opening; and wherein the sleeve is provided with a fastening arrangement for fastening the sleeve to the hub to prevent axial movement between the hub and the sleeve, in a locked configuration.

With such arrangement, the hub and the blades may be indirectly rotationally coupled to the rod of the drive shaft via the sleeve that is engaged in the inner space through an axial insertion opening. Assembly is improved and less time is required to assemble and lock the hub, as compared to solutions using screwing operations.

The mounting area is preferably axially distant from the rod ends, the insertion opening being included in one of a first axial open face and a second axial open face of the annular side wall.

Typically, the fastening arrangement comprises one or more abutment members that prevent axial movement between the hub and the sleeve, in the locked configuration in which the one or more abutment members are engaged with complementary abutment means formed on the hub. In preferred options, the complementary abutment means are provided on the annular side wall with a radial shift (in order to be more radially distant from the central axis of the hub, as compared to the inner surface of the annular side wall which forms the guiding surface).

Thanks to progressive reduction of cross section in one or more areas forming the guiding surface, assembling the hub around the sleeve can be performed without causing high stress between the contact surfaces at the sleeve-hub interface. Moreover, the other surface for contact against the guiding surface may be provided with gaps as in labyrinth seals, so that a concentric configuration can be obtained without high insertion force when mounting the agitating element. As a result, it has been observed that stresses in contact areas are better dissipated and fatigue is highly reduced.

Ribs may be provided to have contact surfaces axially spaced in the other surface, the ribs being for instance provided with rounded/curved longitudinal profile at their ends (without sharp edges). With use of such ribs to have spaced contact areas, tolerance may be erased/compensated due to cooperation with the guiding surface that is typically tapering at the contact areas. In other words, tightness is distributed with a slightly increased ability for adaptation (via the tapering guiding surface), which is of interest to suppress any looseness (due to dimension tolerance for the respective pieces) at contacts between the hub and the rod.

According to a particular, at least two agitating elements are provided around the same rod, using same tapering guiding surface formed in the annular side wall of the hub. Preferably, each agitating element is adapted to be axially moved over the coupling sleeve that surrounds a corresponding mounting area of the rod.

Plastic material (biocompatibility, suitable to be sterilized by gamma irradiation) is used to produce each part of the agitating element, all the sleeve portions and each part of the shaft.

In assembled state of the stirring device, the blades of each impeller assembly are pieces having each a radial extension greater than an outer diameter of the inner surface of the annular side wall measured at the insertion opening. Additionally, there are blades in a first impeller assembly, which are different in shape as compared to blades of a second impeller assembly.

In various embodiments of the stirring device, one or more of the following arrangements may possibly be employed, separately or in combination:
- a plurality of annular contact areas are provided between the guiding surface and protruding means that protrude radially toward the guiding surface from a cylindrical surface of the other surface.
- the protruding means comprise several protruding members that are longitudinally distributed over a length of the mounting area encircled by the sleeve.
- the rod has an outer surface of circular cross-section in the mounting area and the guiding surface is tapering longitudinally.
- the sleeve and the hub are in annular contact with each other at: a first sleeve-hub annular contact area, provided away from the axial insertion opening and defining a first diameter; and at least one second sleeve-hub annular contact area, less distant from the axial insertion opening than the first sleeve-hub annular contact area, and defining a second diameter that is greater than the first diameter.
- the inner surface of the annular side wall is the guiding surface, the outer surface of the sleeve being provided with a plurality of ribs that are longitudinally spaced.
- the abutment members of the sleeve are formed, either on a longitudinal outer rib overlapping at least one rib of the plurality of ribs, or in an axial interspace between two ribs of the plurality of ribs.
- the sleeve comprises two halves, a first abutment member and a second abutment member of said plurality between distributed respectively on the two halves.
- only one of the inner surface of the annular side wall and the outer surface of the sleeve forms the guiding surface provided with a progressive reduction of cross section with increased distance from the axial insertion opening, in the locked configuration, the other surface extending cylindrically around the longitudinal axis that coincides with the central axis of the hub (ribs may be formed on such surface of generally cylindrical shape to have an adjusted fitting onto the guiding surface).
- the hub is adapted to axially slide or rotate on the sleeve already mounted on the rod, until a final position corresponding to the locked configuration.

- the annular side wall of the hub has a symmetry axis coinciding with the central axis of the hub; preferably, the annular side wall has two symmetry axes that are perpendicular and each intersected by the central axis of the hub.
- the sleeve (as assembled around the rod) has a longitudinal symmetry axis; preferably, the sleeve has two symmetry axes that are perpendicular and each intersected by the central axis of the hub in the locked configuration.
- the sleeve that encircles the rod is radially pressed against the rod by a plurality of contact surfaces of the annular side wall, in order to have the plurality of ribs radially compressed inwardly by the hub of the agitating element in the locking configuration.
- the sleeve comprises at least two sleeve portions distributed on a circumference of the rod, each of the sleeve portions having a C-shaped cross-section.
- a first sleeve portion of the sleeve portions comprises a tab extending from a longitudinal side of the first sleeve portion, the tab being configured to slide into a slot on a longitudinal side of a second sleeve portion the sleeve portions which is adjacent to the first sleeve portion.
- the sleeve portions may be identical pieces or tabs may be provided of one of the halves and the slots may be provided on the other one of the halves.
- the sleeve is a one-piece element (possibly hinged).
- the sleeve portions may be provided with two portions (typically two pieces) directly connected with each other via a plastic hinge.
- the sleeve consists of two halves that form the first sleeve portion and the second sleeve portion.
- the sleeve is made of two pieces that are interlocked.
- the rod includes at least two recesses, each of these recesses opening outside through a cylindrical face of the rod, the mounting area being cylindrical without any part or catch protruding from the cylindrical face.
- the sleeve is provided with inner protrusions distributed in the two pieces or two hinged parts, the inner protrusions being engaged in the at least two recesses in the assembled state.
- the blades of a same agitating element are made integral with the annular side wall, the hub being a single piece of rigid plastic material, preferably PETG.
- each of the hub and the rod is a single piece made of plastic material, preferably without any metal component (this of interest to have all parts of the disposable fluid-mixing system disposable and easy to be recycled, especially when the plastic material is PET, preferably PETG)
- only PETG is used to form each of the hub, the impeller assembly, the sleeve, while the rod of the drive shaft is also in PETG.
- the agitating element comprises a flange of annular shape, axially secured to the hub, so that the blades have each an attachment end sandwiched between the flange and a radial annular portion of the hub, one amongst the flange and the hub comprising radially flexible elements engaged in retaining recesses of the other one of the flange and the hub, to ensure axial locking of the agitating element.
- the flange is axially secured to the hub at the opposite to the axial insertion opening.
- the flange may be configured to be clipped to the hub and unclipped to be unfastened, whereby the blades of the impeller assembly can be decoupled by sliding out of the housing parts, while the hub is still fixed to the sleeve.
- the flange may cover an open face, amongst the first axial open face and the second axial open face, that is opposite to the axial insertion opening.
- the hub is provided with at least one retaining recess (that can be accessed from the inner space/inside the annular side wall), in which an abutment member of the one or more abutment members is engaged, the hub further comprising a plurality of housing parts around the annular side wall.
- in the impeller assembly, an attachment end of each of the blades is connected to the hub by being inserted in a corresponding one of the housing parts of the hub (after using the stirring device, the impeller assembly can be advantageously decoupled in order to re-use it, while the drive shaft and the sleeve-hub interface may be discarded).
- the agitating element comprises or consists in: the impeller assembly and only two additional/other pieces that consist in the hub and a flange of annular shape receiving the drive shaft therethrough.
- the flange is axially secured to the hub, each attachment end received in a corresponding housing part of the hub being axially delimited between the flange and a radial annular portion integral with and/or integrally formed with the side wall of the hub;
- the agitating element is a pre-assembled element annularly extending around the inner space and the sleeve is adapted to be fitted in the inner space, such fitting with insertion in the inner space being performed either before engaging the mounting area, or after engaging the mounting area.
- the at least one abutment member of the sleeve comprises two abutment members that are each: formed as a longitudinally continuous protrusion that protrudes radially outwards from the outer surface of the sleeve, and configured to engage into an inner recess of the annular side wall, in order to prevent any relative rotation between the hub and the sleeve.
- the two abutment members are preferably diametrically opposed.
- the stirring device comprises a given number of at least two or three agitating elements around the rod that is a one piece rod, wherein there are a given number of coupling sleeves inserted in the respective hubs of the agitating elements, such coupling sleeves being preferably identical sleeves.

According to a second aspect, embodiments of the invention provide a use of the stirring device in a bioreactor, preferably without any metal particle introduced in an inner volume of the bioreactor, at least one biopharmaceutical fluid being mixed inside a flexible container delimiting the inner volume by the stirring device.

Preferably, the stirring device is used to mix a biopharmaceutical fluid inside a flexible container, wherein the sleeve of the stirring device is a sleeve having a constant inner diameter that is chosen/selected amongst different sleeves that vary in their inner diameter and/or in their maximal outer diameter, so that the chosen sleeve is an adapting part to couple the agitating element to the rod of the drive shaft.

According to another aspect, embodiments of the invention provide a fluid mixing system comprising:
a flexible bag having an interior surface bounding an inner volume forming a compartment; and the stirring device according to the first aspect of the invention, the stirring device being disposed within the inner volume of the flexible bag, the drive shaft being provided with a first connector having a first end and an opposing second end, the first end of the first connector being coupled with the flexible bag, the drive shaft being further provided with a second connector coupled with the flexible bag, the rod extending, preferably linearly, between the first connector and the second connector;

wherein a plurality of agitating elements that form impellers are preferably disposed on the rod at spaced apart locations.

With such arrangement, one or more tapering guiding surfaces may be provided, possibly at each interface connection between a specific coupling sleeve and the hub of a corresponding agitating element. Same tapering orientation is typically used for each of the annular side walls when there are several agitating elements rotatably coupled vie the same kind of sleeve (typically an identical sleeve for each interface with a hub). Alternatively, opposite tapering may be provided for two respective hubs.

Besides, the stirring device can be rotated by a motor close to the top of the flexible bag, using a single rod of rigid plastic to support each agitating element. For instance, the shaft of the stirring device can be magnetically driven, typically by use of a rotary driving disc located outside the flexible bag, the rotary driving disc being operatively engaged with a rotary driven disc attached to a top end of the shaft.

According to another aspect, embodiments of the invention provide a method for assembling a stirring device, the method comprising:

providing a rotatable drive shaft extending along a longitudinal axis, including a rod having a mounting area on an outer cylindrical surface of the rod;

providing a hub and an impeller assembly, which define an agitating element, the agitating element extending around an inner space delimited by an annular side wall of the hub, the impeller assembly comprising a set of generally radially extending blades;

mounting a sleeve of tubular shape on the rod to encircle the mounting area, so that the sleeve forms a coupling sleeve receiving the drive shaft therethrough and is directly rotationally coupled to the rod of the drive shaft;

inserting and engaging the sleeve in the inner space through an axial insertion opening of the annular side wall, so that the hub is directly rotationally coupled to the sleeve, whereby the agitating element is indirectly rotationally coupled to the rod of the drive shaft via the sleeve in an assembled state of the sleeve, in which the sleeve is sandwiched between the mounting area of the rod and the agitating element;

wherein engaging the sleeve in the inner space comprises:
guiding and maintaining a concentric arrangement of the hub and the sleeve, using a guiding surface formed either by an inner surface of the annular side wall, or an outer surface of the sleeve, the guiding surface being provided with a progressive reduction of cross section with increased distance from the axial insertion opening, fastening the sleeve to the hub, by a fastening arrangement of the sleeve, which comprises one or more abutment members to prevent axial movement between the hub and the sleeve in a locked configuration in which the one or more abutment members are engaged with complementary abutment means formed on the side wall so that the sleeve is fixedly coupled to the hub, axially and rotatably.

According to a particular, for obtaining a locked configuration of the hub, a radially flexible locking member of the sleeve is firstly compressed by an annular front end (typically top end) of the annular side wall and then expanded when all or part of the locking member engages in a recess or slot provided in the annular side wall.

The radially flexible locking member may be included in the one or more abutment members, the radially flexible locking member preventing a front annular side of the sleeve from axially abutting against an inner flange of the hub formed at the open axial face opposite to the insertion opening of the hub.

According to a particular, the hub and impeller assembly form a pre-assembled unit or a monolithic unit.

Optionally, the rod is provided with a first mounting area and a second mounting area to permit assembling two distinct agitating elements, the sleeve being a first sleeve encircling a cylindrical face defined at the first mounting area, the stirring device comprising a second sleeve identical to the first sleeve and configured to encircle the second mounting area. Each sleeve may be fastened to a same inner space delimited by a hub of a corresponding agitating element.

In preferred embodiments, the agitating element is firstly formed as a pre-assembled unit, by inserting and accommodating each attachment end the blades of an impeller assembly in a respective hollow part included in one of the hubs.

With such arrangement, there is no requirement for using a screw.

BRIEF DESCRIPTION OF THE DRAWINGS

We will now describe several embodiments of the invention with the aid of the drawings, in which:

FIG. 1 is a perspective view of an exemplary embodiment of a stirring device according to the invention, showing two different kinds of impeller assemblies each attached and locked to a rod of a shaft by using respective coupling sleeves;

FIG. 2 shows a annular part of the rod, in which recesses or slots are provided to receive a coupling sleeve with a retaining effect, such annular part forming a mounting area;

FIGS. 3A and 3B show each a halve of an exemplary coupling sleeve made of two halves, such coupling sleeve in assembled state being used to encircle a mounting area such as illustrated in FIG. 2;

FIG. 4 is a top view of a flange adapted to axially lock the blades of an impeller assembly when fastened to a hub of the impeller assembly;

MORE DETAILED DESCRIPTION

Figure 13:
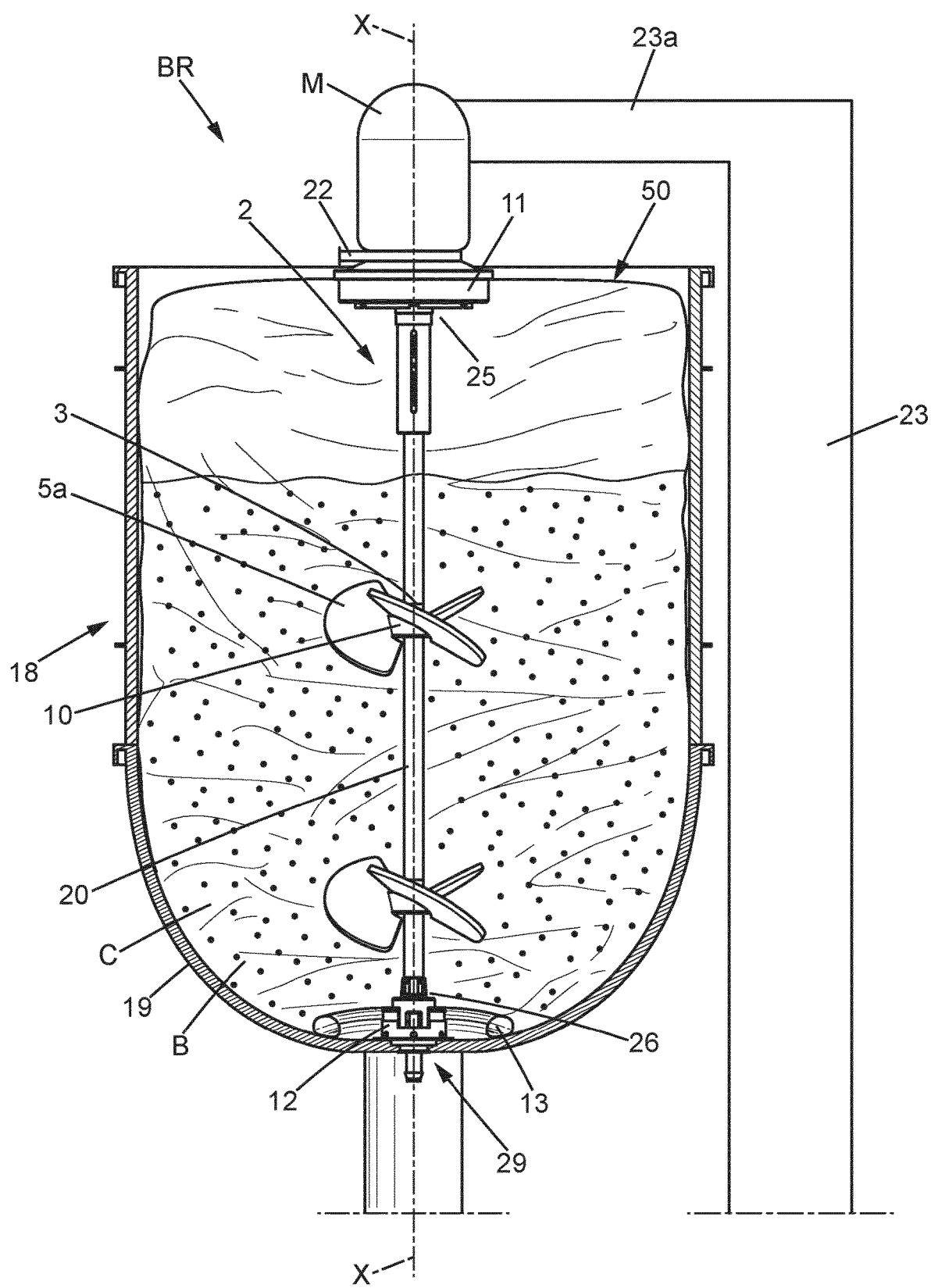
FIG. 13 is a schematic sectional view of a container, provided with a stirring device having same impellers assemblies as in FIGS. 11-12, such container being placed in a rigid outer containment device in operating state for having a mixing, in particular in a filled assembled state.
Figure 14:
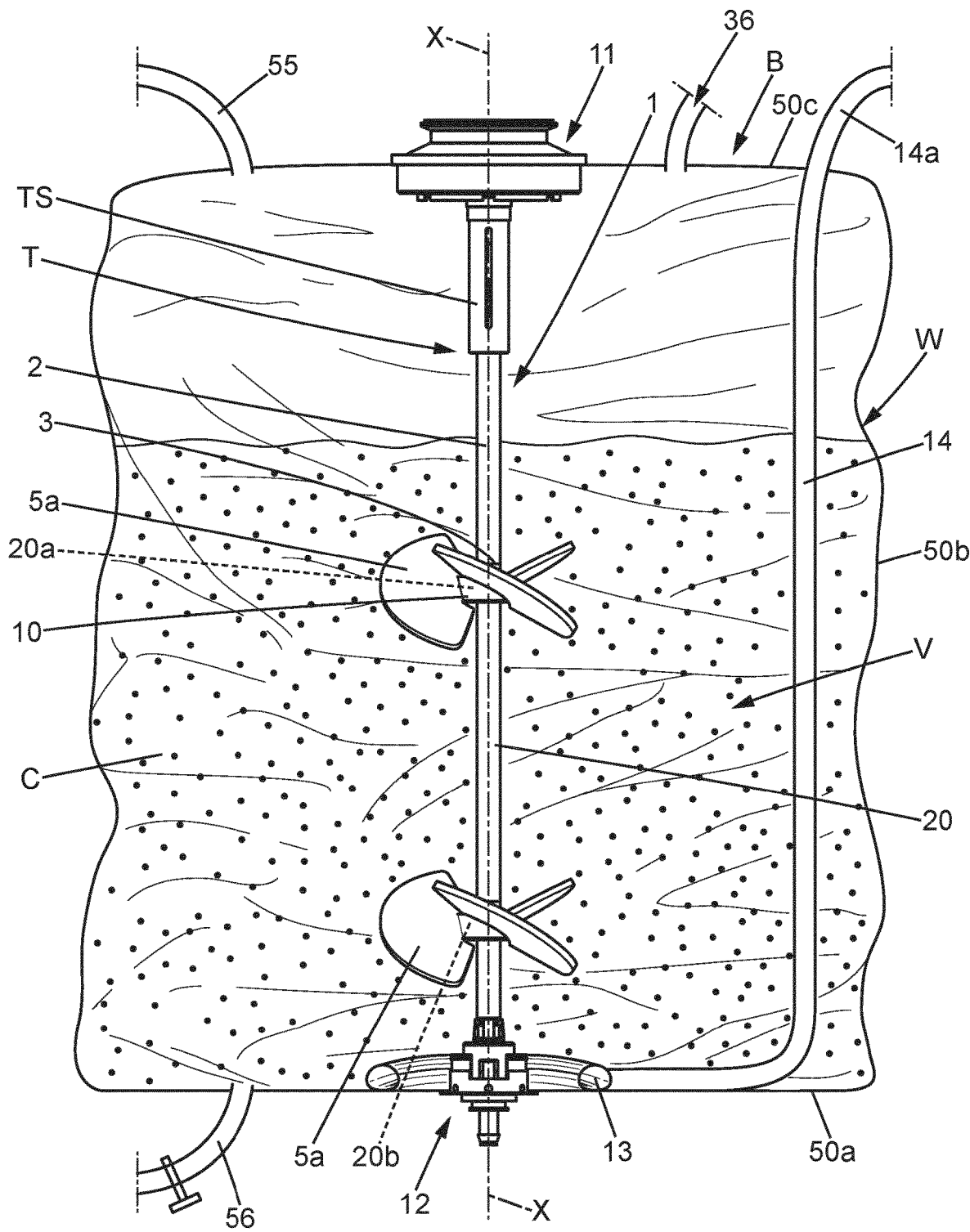
FIG. 14 is a side view of a container intended to be placed in a rigid outer containment as in the whole assembly of FIG. 13, the container being provided with a stirring device similar to FIG. 1, except that the impellers and the corresponding hub are made in a single piece of plastic material.

Referring to FIGS. 1 and 13-14, it is provided a stirring device 1 adapted to be mounted in a fluid-mixing system 50 that receives a biopharmaceutical fluid C for mixing, and/or where appropriate for a chemical and/or biological reaction (or bioreaction). The fluid-mixing system 50 may be arranged inside a rigid outer containment device 18 and a rotatable drive shaft 2 of the stirring device has an end 25 rotationally coupled to a motorized driving part M. The fluid-mixing system 50, the rigid outer containment device 18 are part of a mixer-container BR that is a bioreactor.

The biopharmaceutical fluid C comprises one or at least one liquid phase. Where appropriate, the biopharmaceutical fluid C is formed from multiple components of which at least one is in a liquid phase and of which one or more may be in a solid phase, such as powder.

Figure 10:
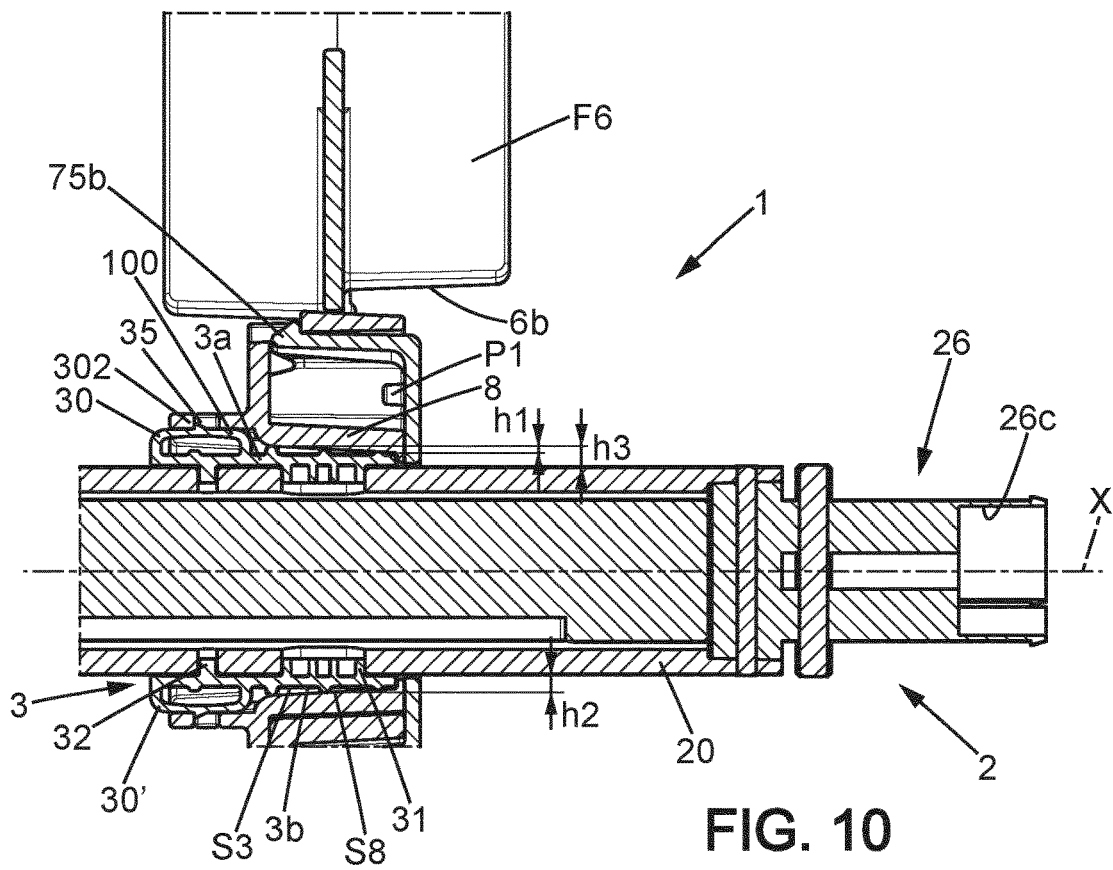
FIG. 10 is a longitudinal cross-section view (almost in a symmetry plane of the rod) of the stirring device of FIG. 1, which is at a 90° angle as compared to the view of FIG. 7, in order to show exemplary contacts between a sleeve and a hub in a cut plane that intersects the anchoring recesses of the rod.

The stirring device 1 has here a rotatable drive shaft 2 extending along a longitudinal axis X between a first end, which may forms the top end 25, and a second end, here forming a lower end 26. These ends may be provided with a cavity or hollow and/or may be inserted in an hollow cylinder part of a bearing. FIG. 10 shows a non-limiting example of a hollow connector 26c provided at one of the shaft ends 25, 26.

As shown in FIGS. 13-14, the mixer-container BR has a vertical main axis XX that is parallel to and may coincide with the longitudinal axis of the shaft 2. The mixer-container BR comprises a flexible container, which is typically a bag B, and a rigid outer containment device 18. The motorized driving part M may in particular be fixed to a supporting arm 23 having a transverse portion 23a. Due to this transverse portion 23a of the supporting arm 23, the motorized driving part M is typically centered over the rigid outer containment device 18, along the main axis XX, and thus intersected by the longitudinal axis X of the drive shaft 2.

As illustrated in FIG. 14, the stirring device 1 extends typically entirely inside the bag B, which is formed by a wall W, advantageously made of plastic, flexible and fluidtight to the biopharmaceutical fluid C. The wall W of the bag B may comprise a bottom part 50a, a side part 50b, and an upper part 50c, for example formed by one or more welded sections made integral to one another. The bag B or container thus defines an inner volume V, advantageously sterile, suitable for receiving a quantity of biopharmaceutical fluid C. The wall W may be completely or partially transparent or translucent in order to be able to view the biopharmaceutical fluid C within the inner volume V, from the exterior.

Besides, the stirring device 1 may also be in plastic material, preferably completely or partially transparent or translucent material. Use of plastic material maybe preferred as the fluid-mixing system 50 is a disposable part of the bioreactor, which means only the motorized driving part M and the outer containment device 18 can be re-used.

The bag B may have a capacity of up to 5000 liters, depending on requirements and applications. However, the container B preferably has a capacity of between 10 and 500 liters, more preferably between 50 and 200 or 2000 liters.

The word "axial" on the one hand, and the words "radial" and "transverse" on the other hand, typically refer to what extends in or parallel or substantially parallel to the longitudinal axis X for the former, and perpendicularly or orthogonally or substantially perpendicularly or orthogonally to the longitudinal X for the latter.

According to some options not represented in the figures, the shaft 2 may be partially located outside of the container or bag B. For instance, the shaft 8 passes through the bag B, in particular at the bearing 11 in a fluid-tight manner. The rotary driven disc of the shaft 2 or similar top driven part is then located outside the bag B of the fluid-mixing bioreactor and is designed to engage functionally, in particular magnetically, with a rotary driving disc or similar rotary driving part of the motorized part M.

Exemplary Embodiments for the Impeller Assembly

Referring to FIGS. 1, 5-6 and 10-14, it can be seen that each impeller assembly 6 is provided with several blades 6a, 6b. A hub 10 is required to have the blades 6a, 6b held by a same crown-like member, to which rotation coupled is transmitted. In some embodiments, the impeller blades 6a or 6b are made separate from the hub 10. In other options, the impeller assembly 6 may be made as a single piece or without any attachment step between the blades 6a, 6b and the hub 10.

The blades 6a, 6b can be fixed on the hub 10 without interfering with fastening of the drive shaft 2 though an inner space 9 of the hub 10. Typically, three blades 6a, 6b are used and may have each a weight greater than 500 or 600 g (for high bag capacities for instance). The blades 6a, 6b are made of plastic material and may have a radial extension higher than 25 cm or 30 cm. The blades 6a, 6b, as assembled or connected with the hub 10, form an impeller assembly 6. As used in the specification and appended claims, the term "impeller" is broadly intended to include all conventional types of impellers and impeller blades along with other structures that can be mounted around mounting portions 20a, 20b of the drive shaft 2 so that when drive shaft 2 is rotated within the container or bag B, the structures can uniformly mix the fluid within the bag B. In the current embodiment, as depicted in FIGS. 1, 5, 10, 13-14, each impeller assembly 6 is connected to a central hub or hub 10 and the blades 6a, 6b are shaped to form a plurality of fins F6 outwardly projecting from a cylindrical part of the hub 10. Such cylindrical part forms all or part of a peripheral exterior surface 106 of the hub 10.

Figure 6:
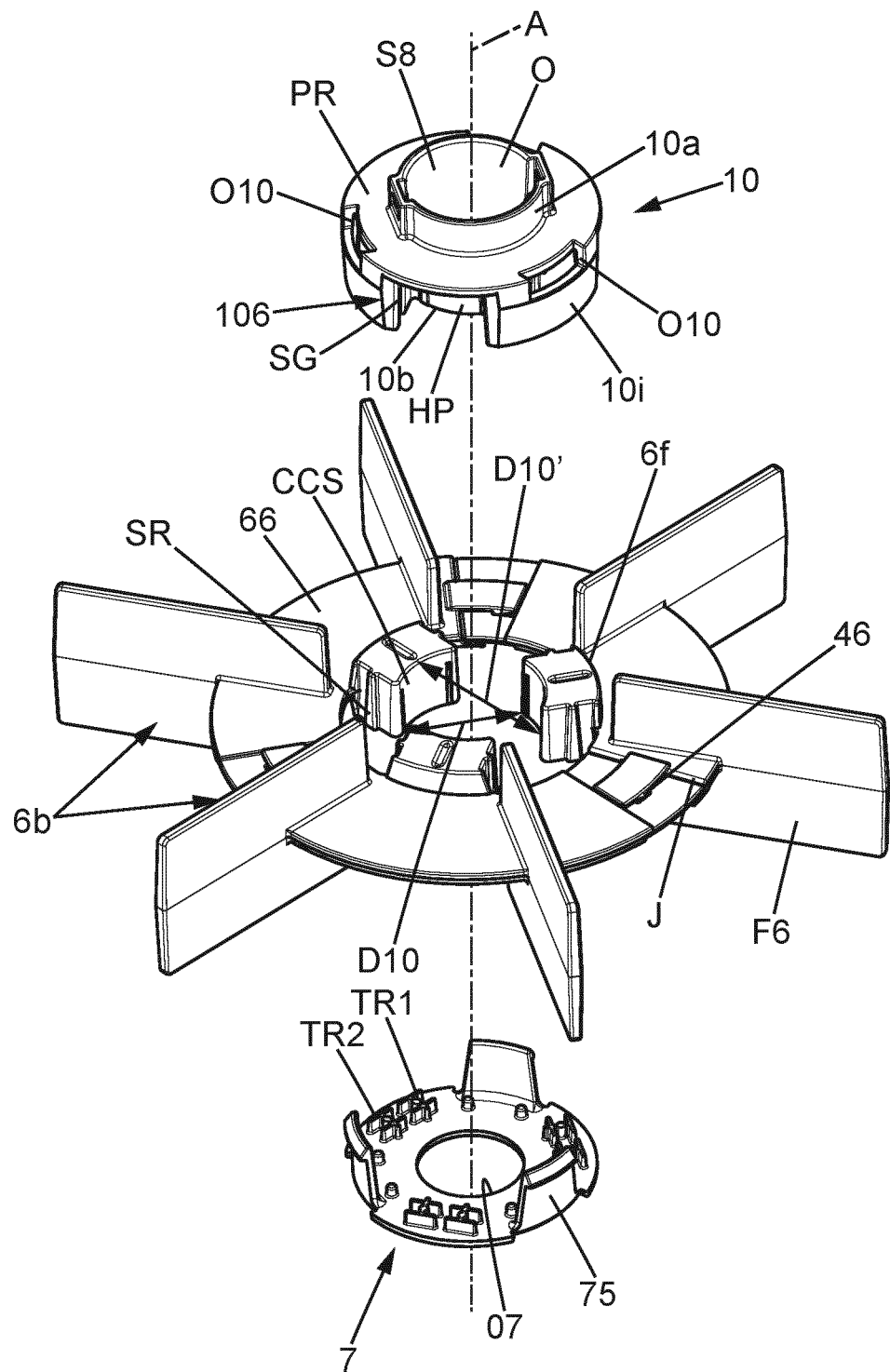
FIG. 6 is an exploded view of an exemplary impeller assembly suitable to be mounted around the rod shown in FIG. 1, after engagement with the sleeve assembly whose halves are shown in FIGS. 3A-3B.

Referring to FIG. 6, the hub 10 has a peripheral exterior surface 106 configured with radial slots, thus forming housing parts HP. At least two or three housing parts may be provided, in order to receive a corresponding attachment ends 6f of the impeller blades 6a. The impeller assembly 6 can be obtained as a pre-assembled unit, possibly by firstly assembling the blades 6b by use of interlocking members 46 arranged on radial sides of the blades 6b, and then axially sandwiching the attachment ends 6f of the blades 6a between an annular radial portion PR of the hub 10 and a separate flange 7.

Figure 11:
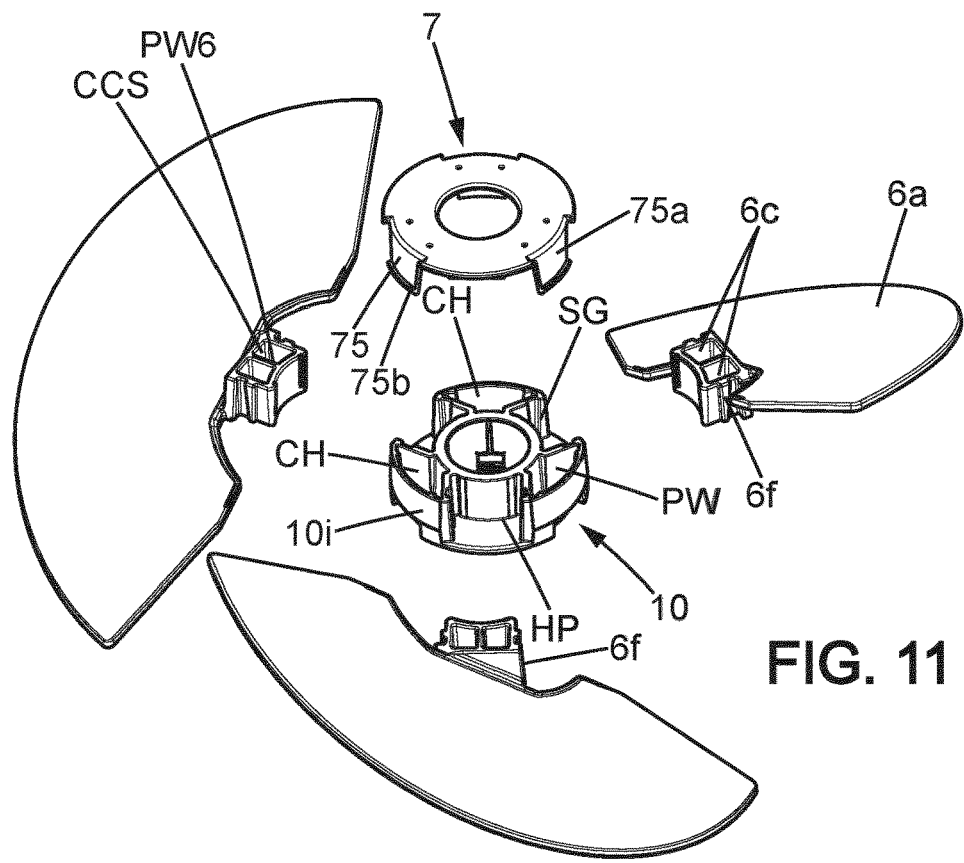
FIG. 11 is an exploded view (from a bottom side) of another exemplary impeller assembly suitable to be mounted around the rod shown in FIG. 1, after engagement with the sleeve.
Figure 12:
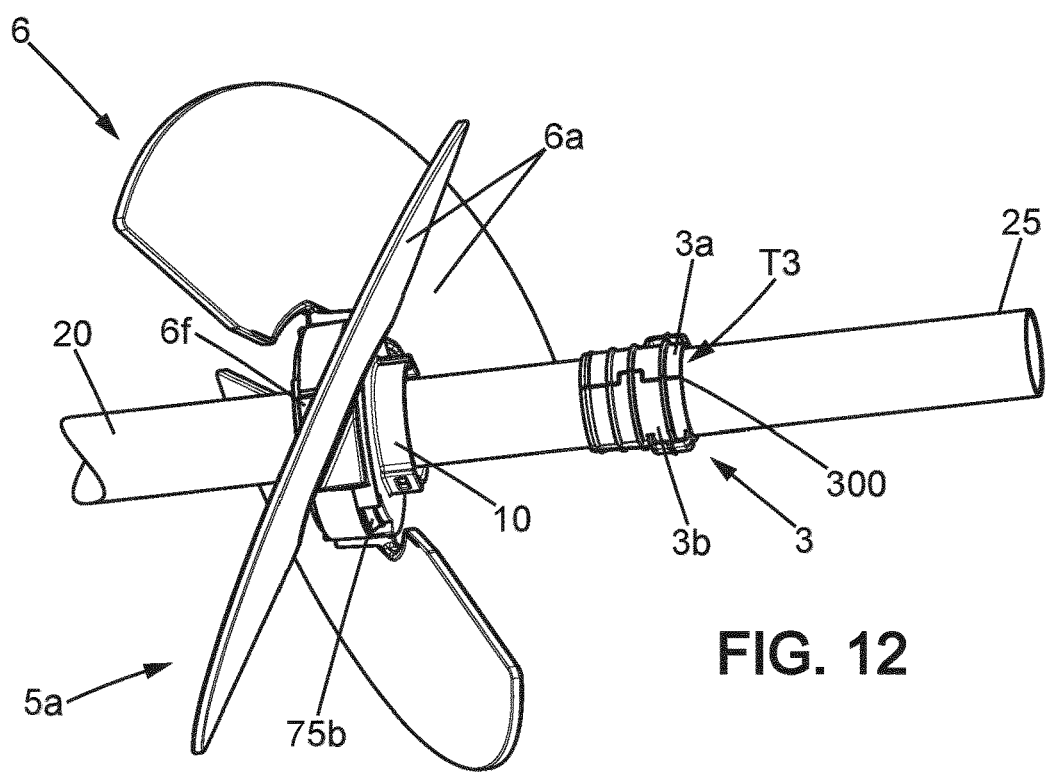
FIG. 12 is a perspective view showing the agitating element that includes the impeller assembly shown in FIG. 11, in a assembled state with the sleeve encircling the mounting area of the rod but before starting process of inserting the sleeve in the hub inner space, the agitation element being possibly the same as the top agitating element shown in FIG. 1.

Referring to FIGS. 1 and 11-12, the blades 6a are typically planar except an interior extension or root portion forming the attachment end 6f The blades 6a may be distributed in order to have an angular position different from a position parallel or perpendicular to the longitudinal axis of the shaft 2, unlike the embodiment with the blades 6b. The blade arrangement may be radially symmetrical, with equal pitch and equal configuration of the blades 6b.

The fins F6 may extend each radially outwards, either from the corresponding attachment end 6, or from an intermediary part forming a first blade portion 66 to which the fin F6 is directly connected. The outer fin F6 shown in FIG. 6 corresponds to a second blade portion integral in rotation with the first blade portion 66. Junctions J may be obtained to have the first blade portions assembled as a continuous disc, using the interlocking members 46 for locking an assembled state of such disc.

More generally, it is understood that fins F6 or the like can comprise any type of impeller blade or blade portion that will function for mixing in the intended application. The hub 10 has an interior surface that corresponds to an inner surface S8 of an annular side wall 8 delimiting the inner space 9 of the hub 10. The inner space 9 may be accessed via an insertion opening O centrally intersected by a central axis A of the hub 10.

The inner surface S8 of the hub 10 has a configuration complementary to exterior surface of a sleeve 3 surrounding a mounting area 20a, 20b of the shaft 2, such sleeve 3 being described in greater detail below. It is understood that the impeller assembly 6 and the hub 10 form together an agitating element 5a, 5b, which is configured to be keyed with or otherwise secured to the drive shaft 2, here via a specific coupling sleeve 3, so that rotation of the drive shaft 2 along a longitudinal axis thereof causes each agitating element 5a, 5b to concurrently rotate therewith.

Non-Limiting Description of the Hub 10 and Construction of the Agitating Elements During assembly, each agitating element 5a, 5b has a central passage (corresponding to the inner space 9) so that it can be slide along the drive shaft 2 until the hub 10 is centrally located around the mounting area 20a, 20b, the sleeve 3 being either fastened to the mounting area 20a, 20b, or to the hub 10 by being engaged in the inner space 9. Axial retaining of the agitating element 5a, 5b will be described later.

Referring to FIGS. 1 and 5-12, the agitating elements 5a, 5b are each provided with a same kind of hub 10. The hub 10 has an annular side wall 8 that extends longitudinally around a central axis A between a first axial open face 8a and a second axial open face 8b. The annular side wall 8 delimits the inner space 9 for insertion of the drive shaft 2 and the sleeve 3. In the non-limiting embodiment of FIGS. 1 and 6-12, the axial insertion opening O is included in one of the first axial open face 8a and the second axial open face 8b, and is typically a top opening when a rod 20 of the drive shaft 2 is inserted through the agitating element 5a, 5b from the axial open face 8a that serves as a hub top face in operation of the stirring device 1. As illustrated in FIGS. 5-8 and 11 in particular, each agitating element 5a, 5b is typically provided with an annular side wall 8 made of a single piece and defining a tapering inner surface S8, here a progressively tapering inner surface forming same angle relative to direction of the central axis A. This inner surface 8 acts as a guiding surface for tightly accommodating the sleeve 3.

Figure 7:
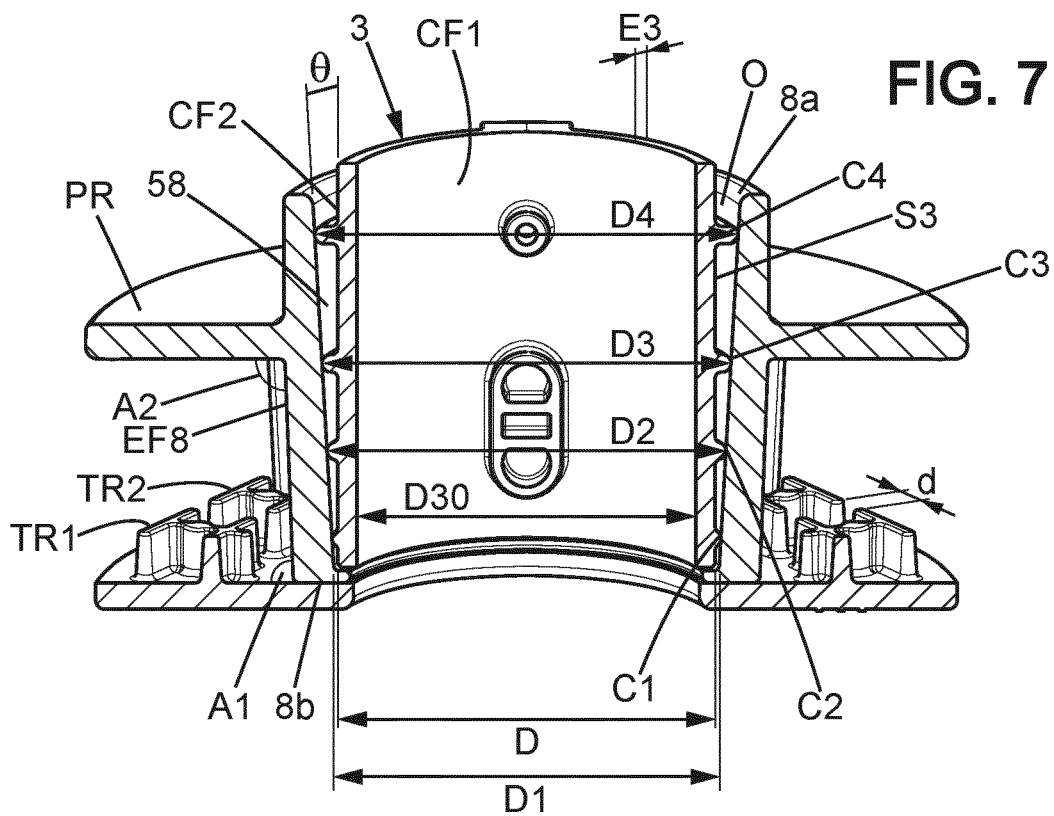
FIG. 7 is a longitudinal cross-section view of the stirring device of FIG. 1, showing exemplary contact areas between a sleeve and a hub and also showing (with blade attachment ends omitted) tapering protrusions arranged in housing parts formed around the annular side wall of the hub.

As shown in FIG. 7, the annular side wall 8 may taper with a constant angle θ comprised between 1 or 1.5° and 20°, preferably between 3° and 12°. The exterior face of the annular side wall 8 also tapers, so that an angle A1 inferior to 90° (as measured in a longitudinal plane including the central axis A) is provided between the flange 7 and the exterior face EF8 of the annular side wall 8. Also, a complementary angle A2 superior to 90° is formed between the annular radial portion PR and the exterior face EF8 of the annular side wall 8. Typically, the following relation can be satisfied:

$$0 < (A2 - A1)/2 \le \theta.$$

As the housing parts are slightly tapering toward the radial portion PR, optional removal of the attachment end 6f may be facilitated if the flange 7 has been removed, for example by unclipping the tabs 75 of the flange 7. Of course, other configurations may be used for the contacts around the side wall 8, possibly without such tapering.

Figure 8:
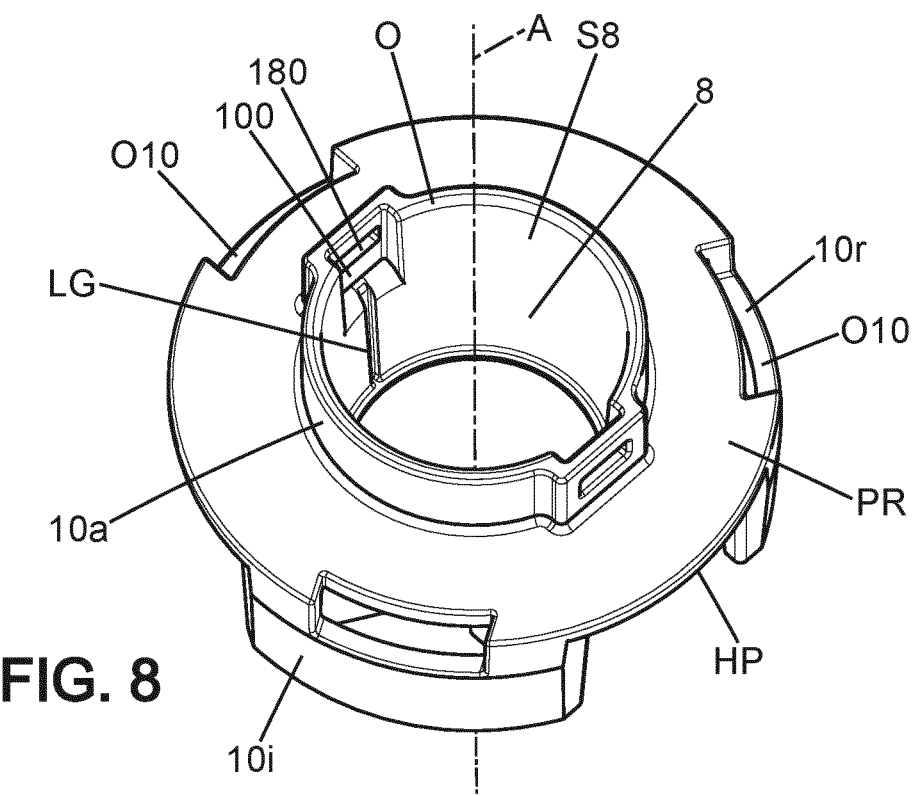
FIG. 8 is a perspective view of a piece forming the hub of FIG. 7, showing the insertion opening of the hub and recesses adjacent to this opening allowing a locked configuration of the hub when engaged by exterior abutment members of the sleeve.

Here, as illustrated in FIGS. 7-8, the insertion opening O may be provided at an axial distance from the radial portion PR, due to a tubular projection 10a forming a protruding end of the annular side wall 8. Below the radial portion PR when the insertion opening O is a top opening, the inner surface 8 may be of circular cross section around the central axis A, except two longitudinal grooves LG that are diametrically opposed. The tubular portion 10b, formed below the radial portion PR, and the tubular projection 10a typically define a common guiding surface for guiding the sleeve 3. At the level of the radial portion and/or above the radial portion PR, the annular side 8 wall can also be provided with a cross-section that progressively increases toward the insertion opening O, but also includes at least two retaining recesses 100 provided with an abutment surface B2 that serves for locking the sleeve 3 as it will be later described. There are typically two wide retaining recesses 100 each extended by one of the longitudinal grooves LG, so that the sleeve 3 is inserted at indexed angles in the inner space 9 of the hub 10 and a wrong angular position cannot be obtained.

A recess or through hole 180 may be formed in the annular side wall 8, in the recessed flat part of the tubular projection 10a, in order to have the abutment surface B2 included in circumference of such recess or hole 180.

In the non-limiting embodiments of FIGS. 6 and 11-12, the attachment ends 6f may be axially inserted in the housing parts HP, using an insertion direction that is opposite to direction for inserting the drive shaft 2 though the hub 10. More generally, the hub 10 is a blade holder and is provided with means for receiving each root portion (typically a single attachment end 6f) of the blades 6a, 6b.

The junction portion, which extends between the attachment end 6*f* and the corresponding fin F6, crosses the peripheral exterior surface 106 through the opening of the corresponding radial slot forming the housing part HP. Each attachment end 6*f* is typically hollow, while the hub 10 is provided with hollow blocks 10*i* alternated with the housing parts HP on the outer circumference of the hub 10, as clearly apparent in FIGS. 5, 8 and 11 in particular. Each hollow block 10*i* is provided with an outer wall part having an in inner tapering face FC facing the annular side wall 8. Such inner tapering face FC is tapering toward the insertion opening O from a lower edge of the outer wall part, so as to guide a corresponding tab 75 formed in the flange 7. The flange is of annular shape around a central opening O7 coinciding with the inner space 9, thus allowing the rod 20 to pass through the inner space 9 and through the flange 7 without significant gap around the rod 20, i.e. typically without radial gap superior to 1 mm. The flange 7 may also be provided with small bosses P1, P2 or protruding reliefs that can laterally rest against the radial partitioning walls PW, which can help in centering the flange and/or attenuate vibrations at the axial end of the partitioning walls PW (axial end away from the radial portion PR).

Figure 5:
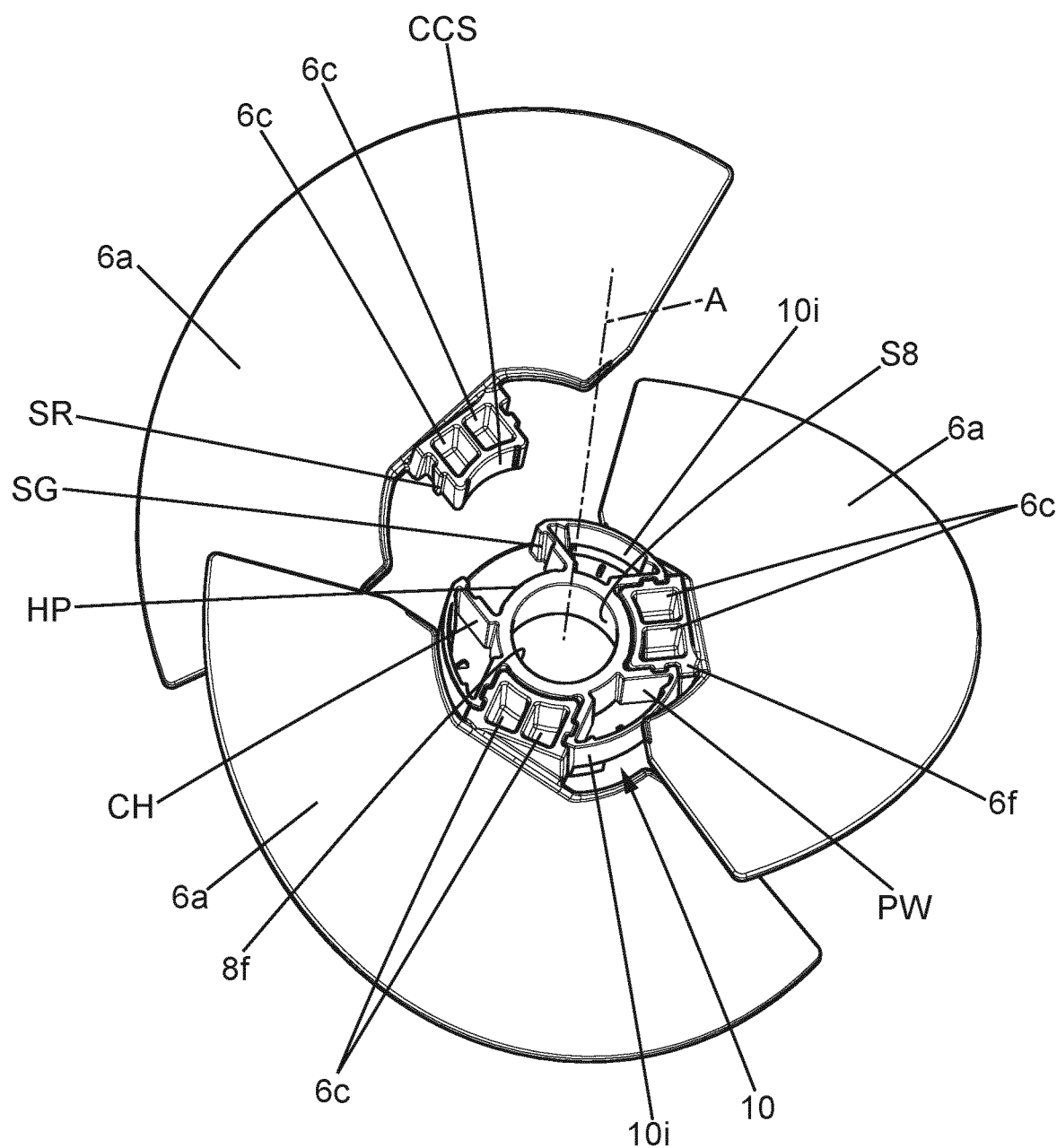
FIG. 5 is a detail of a blade of an impeller assembly, showing an attachment end shaped and sized to fit in housing part of a hub, the attachment end having distinct elements longitudinally tapering in opposite direction, which are part of a contact surface for contact with the annular side wall of the hub.

Referring to FIGS. 4 and 5-8, the flange 7 may contribute in keying each of the attachment ends 6*f*, thanks to male positioning members that form axially tapering protrusions TR1, TR2. Such tapering protrusions TR1, TR2 are inserted in corresponding cavities 6*c* of each attachment end 6*f* It can be seen that two tapering walls that are radially spaced delimit such cavities 6*c*, so that a bottom interior face of each cavity is of narrower section than the opening of same cavity. As illustrated in FIG. 5, the innermost face of the attachment end 6*f* may be tapering in same direction as insertion direction for the tapering protrusions TR1, TR2. This innermost face defines a longitudinally tapering surface CCS.

Referring to FIGS. 5-6 and 11, the longitudinally tapering surface CCS is provided at each attachment end 6*f*, in order to have a complementary shape for sliding engagement without significant play against a corresponding outer surface portion included in the tubular portion 10*b* of the annular side wall 8. The attachment ends 6*f* may also be each provided with one or more side ribs SR that extend longitudinally. Such side rib SR may be engaged, via a sliding movement, in a corresponding side grooves SG formed on partitioning radial walls PW of the hub 10. The side grooves SG have a width that decreases with decreased distance from the insertion opening O.

Respective pairs of the partitioning radial walls PW of the hub 10 are circumferentially delimiting the housing parts HP. Between two adjacent pairs, the hub 10 delimits a chamber CH forming a passage for the tabs 75 of the flange 7. The chambers CH are alternated with the housing parts HP. Similarly on the flange 7, the pairs of slightly spaced tapering protrusions TR1, TR2 (for instance three pairs) are alternated with the tabs 75 (for instance three tabs 75). Besides, the tapering protrusions TR1, TR2 can be spaced by a small distance d suitable for adjusted insertion of a partition wall PW 6 separating two adjacent cavities 6*c* of a blade attachment end 6*f*, between the two adjacent tapering protrusions TR1, TR2.

Figure 9:
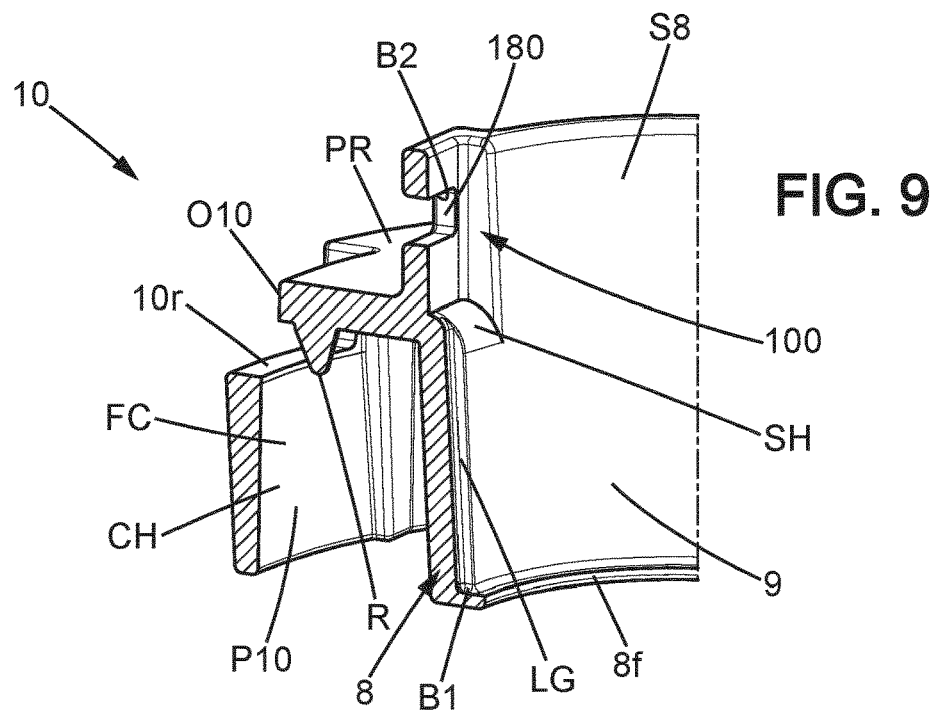
FIG. 9 is a perspective view showing a detail of the structure of the hub, the annular side wall of the hub having inner grooves and recesses for providing guiding and locking functions.

Referring to FIG. 9, it can be seen that the hub 10 may be provided with an inner flange 8*f* reducing the cross section as compared to an end of the annular side wall 8 at the opposite from the insertion opening O. It may form an abutment annular area B1 for abutment of a front edge of the sleeve 3. Typically, no axial abutment onto the annular area B1 is required when the contacts against the sleeve 3 are already sufficient to axially block advance from the sleeve 3 in the inner space 9. Two interior retaining recesses 100, which are preferably diametrically opposed, are sufficient for axially retaining the sleeve 3.

The radial portion PR may be provided with slots used to form radial windows O10, respectively through the outermost wall portion P10 of each hollow block 10*i*. An engaging end part 75*b* of the clip-like tabs 75 can be biased radially inward by the inner tapering face FC during insertion of the tabs 75 in the chambers CH (which occurs simultaneously with insertion of the tapering protrusions TR1, TR2 in the cavities 6*c*), until reaching the window O10. As a result, the tab 75 is released in a locked configuration, in which the engaging end part 75 engage radially outward inside the window O10 and remains in axial abutment relationship against a retaining rim 10*r* delimiting the window O10 or similar recess in the hollow block 10*i*. The local protrusion R facing the window O10 and formed as an axial protrusion from the radial portion PR may serve to progressively push radially outward the engaging end part 75*b* when it reaches the level of the window O10, to obtain a more efficient locking of the flange 7 as the plastic material of the flange 7 is relatively rigid and radial movement of the tabs 75 due to elastic deformation is limited to be less than maximal thickness of the outermost wall portion P10, and/or less than 3 mm.

The agitation element 5*a*, 5*b* is advantageously deprived from any clip or similar elastically/resiliently deformable plastic part. The impeller assembly 6 is either fastened to the hub 10 or integrally made with the hub 10. In any case, the agitating element 5*a*, 5*b* is robust, especially in areas where rotation torque is high.

Rod and Coupling Sleeve

Referring to FIGS. 1-2 and 10, the drive shaft 2 comprises a rod 20, which is preferably a linear rod of tubular shape, entirely made of same rigid plastic material, typically a polymeric material without any metal. The stirring device 1 is provided with a sleeve 3 forming a coupling sleeve receiving the drive shaft 2 therethrough and used as mounting support for the hub 10 of an agitating element 5*a*, 5*b*. The sleeve 3 can be directly rotationally coupled to the rod 20, by encircling a mounting area 20*a*, 20*b* formed on an outer face, preferably a cylindrical outer face of the rod 20. The sleeve 3 is also entirely made of a same rigid plastic material, typically a polymeric material without any metal.

Each mounting area 20*a*, 20*b* of the rod 20 is provided with two diametrically opposed fastening areas so that each of the sleeve portion 3*a*, 3*b* (each piece) may be engaged, typically clipped, in a recess 201, 202 of the rod 20. A clipping is typically used, as a slight elastic deformation is sufficient to maintain the sleeve portions 3*a*, 3*b* relative to the rod 20. Here a recess 201 of small size, possibly of circular section is provided, while another recess 202 is provided with oblong shape. As illustrated in FIG. 10, the angular position for the recesses 100 and the longitudinal grooves LG can be substantially same angular position as for the recesses 201, 202 in an assembled state of the sleeve 3, in which the sleeve 3 is sandwiched between the mounting area 20*a* or 20*b* of the rod 20 and the agitating element 5*a* or 5*b*.

An assembled state of the sleeve 3, as shown in FIGS. 7 and 10, may be obtained by assembling the two halves shown in FIGS. 3A-3B, with contacts only at the surfaces 38*a*, 38*b* in an inserted state of the side tabs 37. In such state the sleeve 3 may essentially include a cylindrical tube T3, which is typically of constant thickness E3. Thickness E3 of the sleeve 3 is here measured between a cylindrical inner face CF1 and a cylindrical outer face CF2 of the sleeve 3. Thickness E3 may be superior or equal to 1.5 mm for making the sleeve 3 robust. PET, preferably PETG may be chosen as plastic material of the rod and of the sleeve as it is less brittle and thickness may be possibly reduced to save plastic material, while still having great strength. Additionally, the sleeve 3 has a plurality of outer ribs R1, R2, R3, R4 or similar reliefs to locally increase the thickness of the sleeve 3, which is thus stiffened by these C.

As illustrated in FIGS. 3 and 12 in particular, the sleeve 3 typically comprises at least one longitudinal separation 300 separating two sleeve portions 3a, 3b, here two halves of the sleeve 3. The outer annular ribs, in the initial mounting state with the sleeve 3 encircling the mounting area 20a, 20b, may be of generally circular or annular shape and each divided into ribs segments or outer ribs R1, R2, R3, R4. In other words, an outer rib R1 in the first sleeve portion 3a and another outer rib R1 arranged at same axial position in the second sleeve portion 3b can form together a generally circular outer annular rib of the sleeve 3.

Embodiments with a combination of two halves, preferably two identical halves, may be preferred as it makes initial mounting of the sleeve 3 onto a mounting area 20a, 20b easy. More generally, each of the sleeve portions 3a, 3b can have a C-shaped cross-section.

In the initial mounting state, the sleeve 3 has its inner face CF1 of cylindrical shape matching with the outer cylindrical surface 200 of the mounting area 20a or 20b. This inner face CF1 is obtained by assembling the two sleeve portions 3a, 3b. Tight contact of this cylindrical inner face CF1 against the rod 20, at the mounting area 20a or 20b shown in FIGS. 1-2, can be obtained without crushing or compressing the sleeves, as there is one or more longitudinal separation(s) 300 between the sleeve portions 3a, 3b, as illustrated in FIG. 12.

Typically, the longitudinal separation 300 corresponds to a gap of about 1 mm (more or less) edge to edge. Mounting the hub 10, in order to obtain a plurality of radial contact areas C1, C2, C3, C4 against the outer ribs R1, R2, R3, R4 cannot deform the inner face CF1 (no crush of the shells forming the sleeve portions 3a, 3b and the edges L3, L3' cannot touch). Referring to FIGS. 3A-3B, only tab-slot contact(s) are provided, by the sliding interface formed between each tab 37 and the corresponding slot 38.

Referring to FIGS. 3A-3B, the first sleeve portion 3a comprises a tab 37 extending from a longitudinal side L3 of the first sleeve portion 3a and configured to slide into a slot 38 formed on a longitudinal side L3' of the second sleeve portion 3b which is adjacent to the first sleeve portion. It has been observed that such structure of sleeve 3, here with two halves, is very efficient to perfectly transmit the rotation from the rod 20 to the agitating element 5a, 5b.

Each of the sleeve portion 3a, 3b is rigid and has a half cylindrical wall stiffened by peripheral outer ribs having each a C-Shape. In assembled state of the sleeve 3, each C-shaped profile of the sleeve portions 3a, 3b is viewed in a plane perpendicular to the longitudinal axis X of the drive shaft 2. The peripheral outer ribs R1, R2, R3, R4 of two adjacent sleeve portions are typically contiguous, so that generally circular ribs (with only interruptions at the separation(s) 300) are formed on an outer cylindrical face of the sleeve 3 in assembled state.

The sleeve 3 and the impeller assembly 6 may be made of same plastic material, possibly without any metal compound or any mineral compound (no mineral fibers or the like) for use with a biopharmaceutical fluid C, typically a biopharmaceutical fluid including living cells, organic compounds).

Assembling Method to Fix the Agitating Element 5a, 5b to the Drive Shaft 2

Before obtaining the locked configuration of the hub 10, the sleeve 3 can be held in a predefined reception or mounting area of the rod 20 where anchoring recesses 201, 202 are provided for each sleeve portion 3a, 3b. Each sleeve portion 3a, 3b has inner protrusions 31, 32 acting for clipping the sleeve portion directly onto the rod 20. The inner protrusions 31, 32 have a circumference shape and size matching the circumference shape and size of the anchoring recesses 201, 202, respectively.

After obtaining the locked configuration of the hub 10, the agitation element 5a, 5b extends axially around the entire predefined mounting area 20a or 20b. An anchoring recess 202 of larger size (as compared to another anchoring recess of same mounting area) may extend to be located in an axial position coinciding with axial position of all the attachment ends 6f of the blades 6a, 6b, while the other anchoring recess 201, of smaller size, is provided in another axial position, which preferably coincides with axial position of the retaining recess 100 provided to retain the radially flexible locking member included in the one or more abutment members.

Here, each of the sleeve portion 3a, 3b is provided with an inner face forming part (half part) of a generally cylindrical face. Typically, the sleeve 3 acts as an adapter that can efficiently transmit rotation movement from the rod 20 to the side wall 8 of the hub 10.

The hub 10 and/or the blades 6a, 6b may be made of rigid plastic material such as a polyester plastic, preferably PETG. Same plastic as the sleeve 3 and the rod 20 can be used, for sake of homogeneity in plastic material in the stirring device 1 and for having homogenous rigidity around the main contacts (for instance around the generally circular contact areas C1, C2, C3) between the hub 10 and the sleeve 3 and directly around the rod 20.

Referring to FIGS. 3A-3B, 10 and 11-12 in particular, it is to be observed that the sleeve portions 3a, 3b are assembled and fastened around the rod 20 such that the sleeve 3 has a cylindrical contact tube T3 that cannot be flexed radially toward the longitudinal axis X. The sleeve 3 is of interest to form a plurality of protruding reliefs, which are configured to simultaneously guide, tightly contact the annular side wall, and which include the fastening arrangement (30, 30') to prevent axial movement between the hub and the sleeve in the locked configuration as illustrated in FIG. 10. Furthermore, the fastening arrangement (30, 30') may be distributed on two opposite sides so that the sleeve 3 can be inserted at indexed angles in the inner space 9 of the hub 10, according to two angular positions each displaced by 180°, since the retaining recesses 100 are also distributed on two opposite sides of the annular side wall 8.

On the cylindrical sleeve tube T3 for contact with the rod 20, on the outer face thereof, abutment members 33, 34, 35 are provided for axially retaining the hub 10 in a locked configuration. The abutment members may comprise two handles 34 and at least one longitudinal rib 33, or similar fastening arrangement able to penetrate inside the respective retaining recesses 100 of the annular side wall, using at least one indexed angle. The longitudinal rib 33 may extend form the front end FR of the sleeve portion to an outer shoulder forming junction between the rib 33 and the handle 34; of course, other configurations for angle indexation reliefs may be used. It is understood that the abutment members 33, 34, 35 comprise:

at least one front abutment region 301 (possibly designed as the outer shoulder at a lower end of the handle 34) for abutting against a shoulder SH or similar stop surface formed in the side wall 8, and at least one locking member 302 adapted to be retained against a stop surface B2 formed in the wall 8, in order to prevent reverse/disengagement sliding.

Here, rotation of the hub 10 around the sleeve 3 is prevented by the interlocked configuration between the abutment members 33, 34, 35 and the inner recessed areas of the side wall 8. More generally, the sleeve 3 may be provided with any suitable outer protrusions (forming abutment members) for axially retain the hub 10, while also preventing rotation between the hub 10 and the sleeve 3, in a locking configuration in which the outer protrusions are engaged in hub recesses. In variants, recesses may be provided in the sleeve 3 and inner protrusions of the hub 10 are engaged in such recesses, in order to prevent relative rotation.

Referring to FIGS. 3A-3B and 9-10, the locking member 302 is formed at an end part or intermediate part of the radially flexible handle 34, so that the locking member 302 (radially flexible or included in the radially flexible part 35) can be radially pushed inwardly. Here, the locking member 302 can be flexed radially inward thanks to flexion of the corresponding handle 34, just before obtaining the locking configuration, due to a contact against a flat surface portion of the annular side wall 8. Each handle 34 may be provided with radial outer arms longitudinally distributed on the tube T3 and interconnected by a radially flexible outer portion 35 that extends longitudinally between the two arms. The shoulder-like abutment member region 301 may be formed by a front arm, while the rear arm is configured to be adjacent the insertion opening O in the locked configuration. Here, when the sleeve 3 is assembled, only the outer portions (in the handle 34) that are radially spaced from the sleeve tube T3 (by the radial arms) can flex radially inward.

The process to assemble the sleeve 3 and the different parts of the agitating element 5a, 5b may begin with assembling two shells forming the sleeve portions 3a, 3b, for instance by inserting the inner protrusions 31, 32 in corresponding rod recesses 201, 202. A clipping may be performed and each tab 37 extends within a corresponding the slot 38, between the two parallel surfaces 38a, 38b of this slot 38. The sleeve portions 3a and 3b may be identical so that there is no assembly order for having the sleeve 3 correctly mounted. The sleeve 3 can define a cylindrical inner face, having a constant diameter D30 (see FIG. 7) in the final locked state and matching with the outer cylindrical surface 200 of the rod at the mounting area 20a, 20b. Optionally, a poke yoke arrangement as illustrated in FIGS. 2 and 3B prevents the operator from misassembling the sleeve 3 (the front ends FR of the sleeve portions 3a, 3b are necessarily correctly positioned, with same axial position). When performing the clipping, the sleeve 3 may be not exactly cylindrical yet and/or the inside diameter provisionally remains superior to the exterior diameter of the rod 2 at this mounting area.

Besides, the blades 6a, 6b may be assembled to be fastened to the hub 10 when the hub is a single separate piece. A cap or flange 7 serve to maintain the hub-blades arrangement by axially covering the axial open face 8b, as illustrated in FIGS. 6-7 and 10-11 (see also FIG. 1 showing the flange 7 mounted as an end cap).

When having the sleeve 3 mounted onto the rod 20 and the agitating element 5a, 5b already pre-assembled (with the flange 7 locking the blades 6a, 6b in the housing parts HP of the hub 10), the hub 10 can simply slide (possibly with a rotation component) along the drive shaft 2 to surround the sleeve 3. FIG. 12 illustrates such step, when the protruding portion 10a is facing the frond ends FR of the sleeve 3, before starting insertion process of inserting the sleeve 3 inside the inner space 9.

The shell-like portions 3a, 3b forming the sleeve 3 are translated in the hub 10 so that the annular side wall 8 tightens the halves on the rod 20 under the cone effect (frustoconical guiding surface S8). When fully inserted, the sleeve 3 is thus sandwiched between a mounting area 20a or 20b of the rod 20 and the agitating element 5a or 5b, as illustrated in FIG. 10. The blades/flange/hub assembly is designated as an agitating element 5a, 5b, here a pre-assembled agitating element 5a, 5b. It can be observed that the rod 20 may be surrounded by several sleeves 3 and, then, a variety of agitating elements 5a, 5b can be mounted around a corresponding sleeve 3.

Referring to FIG. 8, the hub/sleeve interface is configured with a guiding surface for guiding a front insertion end (formed by the front ends FR) of the sleeve 3 with indexed angle, so that:

only restricted rotation is possible once the front insertion end with the front ends FR extends inside the inner space 9 while being still close to the insertion opening 8;

and then no rotation can occur once the front insertion end with the front ends FR extends inside the inner space 9 beyond the shoulders SH of the retaining recesses.

Here the guiding surface is included in the annular side wall 8, as illustrated in FIG. 8. Apart the longitudinal grooves LG and the retaining recesses 100, the inner guiding surface S8 has a frustoconical shape delimiting a frustoconical inner space 9. With such configuration, position of the sleeve 3 inside the inner space 9 is controlled. Concentric arrangement of the hub 10 and the sleeve 3 is maintained by a guiding effect, preventing the operator from any twisting action when obtaining the tight contacts hub-sleeve. The inner surface S8 of the annular side wall 8 has a guiding effect due to a progressive reduction of cross section with increased distance from the axial insertion opening O.

Referring to FIGS. 3A-3B and 7, a plurality of annular contacts C1, C2, C3, C4 are provided between the guiding surface and protruding means, here formed by ribs R1, R2, R3, R4 of the sleeve 3, that protrude radially toward the guiding surface from the cylindrical surface S3. As such protruding means comprises several protruding members that are longitudinally distributed over a length of the mounting area encircled by the sleeve 3, tightness contacts can be simultaneously obtained at the end of inserting the sleeve 3. For having such simultaneity, the sleeve portions 3a, 3b have ribs R1, R2, R3, R4 that have different radial extensions h1, h2, h3, h4, respectively. First ribs R1 arranged at or close to the front ends FR are less protruding than the other ribs R2, R3, R4, as they are in annular contact with an annular area of lower cross section of the annular side wall 8. As a result, the first ribs R1 are provided to obtain a first sleeve-hub annular contact area C1, away from the axial insertion opening O, such contact area C1 defining a first diameter D1 which is relatively close to the constant outer diameter D of the sleeve 3. The ribs R1 proximal to the front ends FR have a constant radial extension h1 and are configured as half circles in the sleeve 3 as assembled.

Besides, at least one and preferably several second sleeve-hub annular contact areas C2, C3, C4 are provided, at positions less distant from the axial insertion opening O than the first contact area C1. Accordingly, there exists one or more contact areas defining a second diameter greater than the first diameter D1 Here in the non-limiting embodiment of FIG. 7, gradually greater diameters D2, D3, D4 are obtained due to progressively higher radial extension of the respective ribs R2, R3, R4. The ribs R4, distal from the frond ends FR and which are configured as half circles in the sleeve 3 as assembled, define a diameter D4 that may be identical to the diameter of the insertion opening O. The ribs R2 and R3 are intermediate ribs to have distributed series of hub sleeve contact areas at different axial positions. The ribs R2, R3, R4 may also have a constant radial extension h2, with h4>h3>h2>h1. Of courses protruding elements for angle indexation that extend longitudinally, across and/or by overlapping such ribs R1, R2, R3, R4, may protrude more outwardly than the ribs R1, R2, R3, R4 but they are not intended to be in tight radial contact against groove or recess bottom surface (they are not in contact with a guiding surface of circular cross section, which tapers from the insertion opening O).

Axial locking by the shoulder or similar abutment region 301 included in the sleeve 3 is obtained to block translation movement, simultaneously with a clipping action to stop possible reverse translation inside the inner space 9. The locking member 302 may be engaged through the hole 180 for having this clipping action. Referring to FIGS. 3A and 7-10, it is understood that the hole 180 is axially spaced from the shoulder SH by a distance that is identical to axial distance between an outer free edge of the locking member 302 and the shoulder region 301 for abutment.

While the fixing by the sleeve 3 is here described using a translation to clip the one or more locking members 302, some variants may be used: for instance, rotation with translation of one of the hub or the sleeve may be performed and then clipping or just stop in abutment (like a screw) can be sufficient to have the hub 10 fastened and axially blocked around the sleeve 3.

In some variants, axial blocking is obtained with several positions (axial position) of clips, in order to vary/adapt the radial clamping force. Some clips may optionally be not used for locking the axial final position of the hub. Typically, the hub 10 cannot be disassembled as the locking members 302 are not available from outside. The hole 180 may be replaced by a recess without any outer access to the tab 75.

Besides, some embodiments provide a lever part or similar unlatching member, which may be included in the fastening arrangement (30, 30'), so that the hub 10 is removable. The lever part or similar unlatching member is possibly included in each of the sleeve portions 3a, 3b and a pushing action or similar appropriate actuation, using the unlatching member, can cause the locking member 302 to reach a retracted position outside the recess or hole 180.

Due to frustoconical distribution of tightness contacts of the concentric hub-sleeve-rod assembly, without using longitudinal edges or threads at least in a cylindrical tube T3 of the sleeve 3, the agitating element 5a, 5b may be mounted in simple manner without tendency for vibration and fatigue. The gaps 58 between the surface S3 and the tapering inner surface S8 can be compared to gaps of a labyrinth seal. They do not lower tightness contact for torque transmission as several contact areas C1, C2, C3, C4 of generally circular shape are provided along length of the annular side wall 8. Preferably, at least three annular contact areas are provided with three different diameters defined at the contact interfaces.

Referring to FIGS. 6-7, tapering shape may be also used for surfaces that form hub-attachment end interfaces. The attachment ends 6f are disposed concentrically around the inner space 9 of the hub 10, while having longitudinally tapering surfaces CCS that taper in reverse direction as compared to the annular side wall 8. The attachment ends 6f thus have first faces for contact with the radial portion PR of the hub 10, which delimit inscribed circle of lower size/diameter D10 as compared to inscribed circle of size/dimeter D10' obtained at the level of the opposite open faces engaged by the flange 7. Such arrangement of the blades 6a, 6b is also robust and the hub provides modularity as several kind of blades 6a, 6b may be used to form the impeller assembly 6.

Besides, it is permitted to erase dimension tolerance in the assembled state, due to tightness contacts that are distributed and not extending in a cylindrical manner. Indeed, the sleeve 3 is provided with outer ribs R1, R2, R3, R4 that are typically rounded/curved at their ends. More generally it is understood that use of the outer ribs R1, R2, R3, R4 to have spaced contact areas C1, C2, C3, C4 provides some additional tolerance when cooperating with the tapering surface of the inner surface S8 of the side wall 8. In other words, tightness is distributed with a slightly increased tolerance via the tapering guiding surface, typically formed on the annular side wall 8, which is of interest to suppress any empty gap between the hub 10 and the rod 20. It may advantageously decrease vibration and fatigue.

Exemplary Fluid-Mixing Container 50 and Method for Assembling Such Fluid-Mixing System 50

Referring to FIG. 14, the bag B of the fluid-mixing container 50 is essentially composed of the wall W and is provided with opposite bearing 11, 12 tightly secured to the wall W. The bag may be also provided with one or more through-ports 55 for introducing, into the container 2, the biopharmaceutical fluid C or components of the biopharmaceutical fluid C; these ports engage with one or more fill holes formed in the wall W of the bag B.

The fluid-mixing container 50 may also comprise at least one through-port 56 for draining biopharmaceutical fluid C from the bag B, engaging with at least one drain hole formed in the bag B. The drain port 56 is able to be closed when necessary and opened for draining.

The term "port" is understood to refer to a physical connection means. Such a port is a through-port when it places in communication the inner volume V and the exterior of the container 2, for example for the introduction or discharge of what is to be placed or has been placed in the container 2. Such a port may also not be a non-through-port when it serves to hold a member of the mixer-container.

Ducts, pouches, reservoirs, if necessary flexible, may be associated with the introduction port 55, in fluid communication and with a sealed connection and removable where appropriate. Similarly, ducts, pouches, reservoirs, if necessary flexible, may be associated with the drain port 56, in fluid communication and with a sealed connection and removable where appropriate.

In the embodiment represented in FIG. 14, the introduction port 55 is located in the upper part 50c of the wall W, while the drain port 56 is located in the lower part 50a of the bag B, in particular in the lowest position of the fluid-mixing system 50. However, this embodiment is not limiting and one or more introduction ports 55 may be located in the lower part 50a or in the side part 50b of the container forming the fluid-mixing system. In this exemplary embodiment, the wall W is a single wall of the system 50.

Optionally, the system 50 may also comprise an aeration device 13 adapted to deliver to the biopharmaceutical fluid C a certain quantity of aeration gas. This device 13 thus allows aeration of what is in the inner volume V, whether it is biopharmaceutical fluid or part of its components.

With such configuration, the stirring device 1 may advantageously comprise agitation elements 5a, 5b that include a lower agitation element 5a or 5b at a small distance from the lower part or bottom 50a of the bag B and an upper agitation element 5a or 5b at a comparatively higher distance from the upper part or top 50c of the bag B, in an expanded state of the bag B. Typically, in a vertical position of the rod 20:

the lower mounting area 20b may be arranged in a lower rod section (forming a first end section of the rod 20) that represents not more than a quarter of total length of the rod 20; and the uppermost mounting area 20a may be arranged so as to be located entirely above half height of the rod 20, in a position closer to an upper end edge of the rod than to the lower mounting, while being preferably more distant from the upper end edge than the lower mounting is from a lowed end edge of the rod.

Still referring to FIG. 14, the aeration device 13 may comprise an aeration gas supply device 14 having at least one tubular element 14a extending from outside the container 2 with fluid communication. There may be operatively associated, with the aeration device 13 just described, at least one aeration gas discharge port 36 formed in the upper part 50c of the wall W of the bag B. Such an aeration gas discharge port 36 serves to discharge from the bag B, to the exterior, gas that has not been mixed with the biopharmaceutical fluid C.

In some embodiments, the fluid-mixing system 50 may also comprise other ports which are known per se, for example for mounting an operative means, suitable for retaining a member typically for the collection or measurement of data for example, or sample collection for analysis.

The stirring device 1 allows mixing what is in the inner volume V, whether this is biopharmaceutical fluid C or some of its components. A telescopic arrangement is here provided. Typically, the rod 20 forms an outermost surface of the rotatable drive shaft 2, in sliding relationship with a tube T that is provided in an upper region of the inner volume V. In variants as shown in FIG. 14, the tube T only allows for about 4 to 15% increase in height and can extend around an upper rod section (forming a second end section of the rod 20) that is deprived from any mounting portion 20a, 20b for mounting an agitating element. Here, it can be seen a slot TS for allowing the drive shaft to be longitudinally extended. When the rod 20 can slide inside such tube T, it is understood that the uppermost mounting area 20a extends at a distance from the rod upper end edge which is greater than height of the tube T.

When beginning assembling of the fluid-mixing system 50, the container or bag B may be initially separate and arranged outside of the rigid outer containment device 18, as well as empty of biopharmaceutical fluid C and more or less flattened on itself. The bag B is placed in the housing within the rigid outer containment device 18, resting on its bottom wall 19.

A bearing 12 of the bag B, here a lower bearing 12, is connected to the rigid outer containment device 18, for example with an opening 29 located at the center of the bottom wall 19. Then the other bearing 11 of the bag 2 is positioned with respect to the motorized driving part M. The wall 3 of the container 2 is therefore brought to the level of the motorized driving part M.

When provided with a telescopic arrangement, the drive shaft 2 is in an at least partially retracted position and each agitating element 5a, 5b is already mounted and locked onto the rod 20 of the shaft 2. As the shaft 2 is here adjustable in length, it is possible to first place the bearing 11 at a distance away from the motorized driving part M. The coupling parts of the magnetic driving arrangement or similar coupling parts may be facing each other. A rotatory disc or similar coupling element integral with the bearing 11 can be located facing motorized driving part M. Next, the length of the shaft 2 is increased so that the bearing 11 (here the upper bearing) is positioned next to the motor of the part M, in particular connected without friction and with a runout clearance between a rotary driving disc of the motor and the bearing 11, so that the motorized driving part M can rotate easily. Such kind of tube T is not necessary to vary the position of the motor when connecting the bearing 11 with the motor. In some options the slot TS is provided on the rod 20. Besides, the sliding in the slot TS to increase the length may be obtained without any locking element in the shaft 2.

Referring to FIG. 13, the motorized driving part M is connected with a collar of a flange or similar coupling part, in order to be integral in translation, via a clamp 22 (tri-clamp cuff). Thus arranged, a rotary driving disc of the motorized driving part M is able to rotate a corresponding rotary driven disc included in the bearing 11, and thus the shaft 2 of the stirring device 1. FIG. 13 shows the fluid-mixing container 50 thus arranged with the rigid outer containment device 18 and the motorized driving part M.

Alternatively, it is possible to connect the bearing 11 of the container 2 with the motorized driving part M before connecting the other bearing 12 (lower bearing) with the rigid outer containment device 18.

The biopharmaceutical fluid C is introduced into the inner volume V, by means of the introduction port 55.

Finally, the stirring device 1 is used to stir the biopharmaceutical fluid C located in the inner volume V. If required, the length of the shaft 2 adjusts to guarantee the optimal relative positioning of the motorized driving part M and the bearing 11.

In the context of a bioreaction process, an aeration device 13 may be used to deliver a certain amount of aeration gas into the contents of the container or bag B. Stirring and aeration are carried out at least partially simultaneously, where appropriate entirely simultaneously. After mixing the biopharmaceutical fluid C and then draining it, in particular through the drain port 56, the bag B can be disassembled from the rigid outer containment device 18. The bag is then discarded, as it is disposable.

The method described above may be carried out only partially, as the steps described above can be carried out independently of one another. In particular, the bag B can be arranged in the rigid outer containment device 18 when it is already filled with biopharmaceutical fluid C.

Obviously, the invention is not limited to the embodiments described above and provided only as examples. It encompasses various modifications, alternative forms, and other variants conceivable to a person skilled in the art in the context of the invention, in particular any combination of the different modes of operation described above, which may be taken separately or in combination. For instance, the vessel receiving the stirring device 1 may be different. The vessel is possibly configured so that the rod 20 extends not vertically, for instance horizontally.

Of course, the depicted embodiments are in no way limiting the construction options for the stirring device 1. While the hub 10 has been described has forming an annular side wall 8 made of a single piece, an assembly of two or more pieces may also be used to form such side wall.

In some variants, the sleeve 3 as assembled may be provided with notching elements or threads cooperating with a corresponding interface present in a mounting area of the rod 2. Also, it is understood that the sleeve 3 can also be assembled by firstly be fastened to the hub 10, before being mounted onto the corresponding mounting area 20a, 20b.

Besides, the tapering or similar progressive reduction of cross section for contacting the hub 10 may be provided with a regularly curved profile surface (in cross section perpendicular to the rod) or with partly irregular profiles. While the contact tube of the sleeve 3 has a generally cylindrical shape in the illustrated examples, it is understood that the contact tube may have a different shape, depending on particulars of the rod area for receiving the sleeve 3. For instance, flat spots or other non-circular parts may be provided in the contact tube, which may be of partial cylindrical shape or provided with angles (typically polygonal shape). In some variants, a star shape or other shape with angles can also be provided for the contact tube of the sleeve 3, in order to match with complementary receiving portions of the rod 20.

The invention claimed is:

1. A stirring device for a mixer-container, comprising:
a rotatable drive shaft extending along a longitudinal axis;
an agitating element; and
a sleeve of tubular shape;
wherein the drive shaft comprises a rod, the sleeve forming a coupling sleeve receiving the drive shaft therethrough and being directly rotationally coupled to the rod of the drive shaft, the sleeve being sandwiched in an assembled state between a mounting area of the rod and the agitating element,
wherein the agitating element comprises:
a hub which has an annular side wall that extends longitudinally around a central axis, the annular side wall delimiting an inner space; and
an impeller assembly comprising a set of generally radially extending blades, the blades and the hub being indirectly rotationally coupled to the rod of the drive shaft via the sleeve that is engaged in the inner space through an axial insertion opening so that the hub extends around the sleeve;
and wherein the hub is directly rotationally coupled to the sleeve, one of an inner surface of the annular side wall and an outer surface of the sleeve being a guiding surface provided with a progressive reduction of cross section with increased distance from the axial insertion opening;
and wherein the sleeve is provided with a fastening arrangement for fastening the sleeve to the hub, the fastening arrangement comprising one or more abutment members that prevent axial movement between the hub and the sleeve, in a locked configuration in which the one or more abutment members are engaged with complementary abutment means formed on the hub, formed on the annular side wall.

2. The stirring device according to claim 1, wherein a plurality of annular contact areas are provided between the guiding surface and protruding means that protrude radially toward the guiding surface from a cylindrical surface, the protruding means comprising several protruding members that are longitudinally distributed over a length of the mounting area encircled by the sleeve.

3. The stirring device according to claim 1, wherein the rod has an outer surface of circular cross-section in the mounting area and the guiding surface is tapering longitudinally, the sleeve and the hub being in annular contact with each other at:
a first sleeve-hub annular contact area, provided away from the axial insertion opening and defining a first diameter; and
at least one second sleeve-hub annular contact area, less distant from the axial insertion opening than the first sleeve-hub annular contact area, and defining a second diameter that is greater than the first diameter.

4. The stirring device according to claim 1, wherein the inner surface of the annular side wall is the guiding surface, the outer surface of the sleeve being provided with a plurality of ribs that are longitudinally spaced.

5. The stirring device according to claim 2, wherein the hub is adapted to axially slide or rotate on the sleeve already mounted on the rod, until a final position corresponding to the locked configuration,
and wherein the sleeve that encircles the rod is radially pressed against the rod by a plurality of contact surfaces of the annular side wall, in order to have the plurality of ribs radially compressed inwardly by the hub of the agitating element in the locked configuration.

6. The stirring device according to claim 1, wherein the sleeve comprises at least two sleeve portions distributed on a circumference of the rod, each of the sleeve portions having a C-shaped cross-section, a first sleeve portion of the sleeve portions comprising a tab extending from a longitudinal side of the first sleeve portion and configured to slide into a slot on a longitudinal side of a second sleeve portion of the sleeve portions which is adjacent to the first sleeve portion.

7. The stirring device according to claim 6, wherein the sleeve consists of two halves that form the first sleeve portion and the second sleeve portion.

8. The stirring device according to claim 1, wherein the sleeve is made of two pieces that are interlocked, the rod including at least two recesses opening outside through a cylindrical face of the rod, the mounting area being cylindrical without any part or catch protruding from the cylindrical face,
wherein the sleeve is provided with inner protrusions distributed in the two pieces, the inner protrusions being engaged in the at least two recesses in the assembled state.

9. The stirring device according to claim 1, wherein each of the hub and the rod is a single piece made of plastic material, without any metal component.

10. The stirring device according to claim 1, wherein the agitating element comprises a flange of annular shape, axially secured to the hub, so that the blades have each an attachment end sandwiched between the flange and a radial annular portion of the hub, one amongst the flange and the hub comprising radially flexible elements engaged in retaining recesses of the other one of the flange and the hub to ensure axial locking of the agitating element, the flange being axially secured to the hub at the opposite to the axial insertion opening.

11. The stirring device according to claim 1, wherein the hub is provided with at least one retaining recess, into which an abutment member of the one or more abutment members is engaged, the hub further comprising a plurality of housing parts around the annular side wall;
wherein the agitating element comprises:
the impeller assembly, in which an attachment end of each of the blades is connected to the hub by being axially inserted, in a corresponding one of the housing parts of the hub; and
only two other pieces that consist in the hub and a flange of annular shape receiving the drive shaft therethrough;
and wherein the flange is axially secured to the hub, each attachment end received in a corresponding housing part of the hub being axially delimited between the flange and a radial annular portion integrally formed with the side wall of the hub;

the agitating element forming a pre-assembled element annularly extending around the inner space and the sleeve being adapted to be fitted in the inner space.

12. The stirring device according to claim 1, wherein the one or more abutment members comprise two abutment members that are each:
   formed as a longitudinally continuous protrusion that protrudes radially outwards from the outer surface of the sleeve, and
   configured to engage into an inner recess of the annular side wall, in order to prevent any relative rotation between the hub and the sleeve,
the two abutment members being diametrically opposed.

13. A fluid mixing system comprising:
   a flexible bag having an interior surface bounding an inner volume forming a compartment; and
   the stirring device according to claim 1, the stirring device being disposed within the inner volume of the flexible bag, the drive shaft being provided with a first connector having a first end and an opposing second end, the first end of the first connector being coupled with the flexible bag, the drive shaft being further provided with a second connector coupled with the flexible bag, the rod extending between the first connector and the second connector;
wherein a plurality of agitating elements that form impellers are disposed on the rod at spaced apart locations.

14. A method for assembling a stirring device, the method comprising:
   providing a rotatable drive shaft extending along a longitudinal axis, including a rod having a mounting area on an outer cylindrical surface of the rod;
   providing a hub and an impeller assembly that define an agitating element, the agitating element extending around an inner space delimited by an annular side wall of the hub, the impeller assembly comprising a set of generally radially extending blades;
   mounting a sleeve of tubular shape on the rod to encircle the mounting area, so that the sleeve forms a coupling sleeve receiving the drive shaft therethrough and is directly rotationally coupled to the rod of the drive shaft;
   inserting and engaging the sleeve in the inner space through an axial insertion opening of the annular side wall, so that the hub is directly rotationally coupled to the sleeve with the hub assembled around the sleeve, whereby the agitating element is indirectly rotationally coupled to the rod of the drive shaft via the sleeve in an assembled state of the sleeve, in which the sleeve is sandwiched between the mounting area of the rod and the agitating element;
   wherein engaging the sleeve in the inner space comprises:
      fastening the sleeve to the hub, by a fastening arrangement of the sleeve, which comprises one or more abutment members to prevent axial movement between the hub and the sleeve in a locked configuration in which the one or more abutment members are engaged with complementary abutment means formed on the annular side wall so that the sleeve is fixedly coupled to the hub, axially and rotatably, and
      guiding and maintaining a concentric arrangement of the hub and the sleeve, using a guiding surface formed either by an inner surface of the annular side wall, or an outer surface of the sleeve, the guiding surface being provided with a progressive reduction of cross section with increased distance, in the locked configuration, from the axial insertion opening.

* * * * *